(12) United States Patent
Kraft et al.

(10) Patent No.: US 11,279,217 B2
(45) Date of Patent: Mar. 22, 2022

(54) SUBFRAME AND SUSPENSION ASSEMBLY

(71) Applicant: Faraday&Future Inc., Gardena, CA (US)

(72) Inventors: Ryan Matthew Kraft, Hermosa Beach, CA (US); Joseph A. Kurcz, Newport Beach, CA (US); Timm Sebastian Redder, Ladera Ranch, CA (US)

(73) Assignee: Faraday&Future Inc., Gardena, CA (US)

( * ) Notice: Subject to any disclaimer, the term of this patent is extended or adjusted under 35 U.S.C. 154(b) by 0 days.

(21) Appl. No.: 15/674,471

(22) Filed: Aug. 10, 2017

(65) Prior Publication Data

US 2019/0193546 A1    Jun. 27, 2019

Related U.S. Application Data

(60) Provisional application No. 62/373,213, filed on Aug. 10, 2016.

(51) Int. Cl.
| | |
|---|---|
| *B60K 1/00* | (2006.01) |
| *B62D 21/11* | (2006.01) |
| *B60G 21/055* | (2006.01) |
| *B60G 11/18* | (2006.01) |

(Continued)

(52) U.S. Cl.
CPC .................. *B60K 1/00* (2013.01); *B60G 3/20* (2013.01); *B60G 11/181* (2013.01); *B60G 21/0551* (2013.01); *B60K 7/0007* (2013.01); *B62D 21/11* (2013.01); *B60G 2200/18* (2013.01); *B60G 2200/44* (2013.01); *B60G 2204/15* (2013.01); *B60G 2300/50* (2013.01); *B60K 2007/0046* (2013.01); *B60K 2007/0092* (2013.01); *B60Y 2306/01* (2013.01); *B60Y 2400/61* (2013.01)

(58) Field of Classification Search
CPC ... B60K 1/00; B60K 1/02; B60K 7/00; B60K 7/0007; B60K 2007/0092; B60K 2007/0046; B62D 21/11; B62D 21/00; B62D 21/152; B62D 21/155; B62D 21/15; B60G 3/00; B60G 3/20; B60G 3/22; B60G 11/181; B60G 11/18; B60G 11/00; B60G 21/0551; B60G 21/055; B60G 21/05; B60G 2300/50
See application file for complete search history.

(56) References Cited

U.S. PATENT DOCUMENTS

| | | | |
|---|---|---|---|
| 6,357,769 B1 * | 3/2002 | Omundson | B60G 3/24 180/312 |
| 7,874,395 B2 * | 1/2011 | Taji | H02K 7/006 180/300 |

(Continued)

*Primary Examiner* — James M Dolak
(74) *Attorney, Agent, or Firm* — Veros Legal Solutions, LLP

(57) ABSTRACT

Disclosed herein is a rear subframe and suspension system. The subframe may be configured to accommodate one or two electric motors for propelling an automobile. The subframe may be configured such that the motor(s) is inserted through the front end of the subframe. The subframe may substantially surround the motor. Braces may be the coupled to the subframe to secure the motor within the subframe. The subframe may further include built-in motor mounts. An independent rear suspension system and rear steering system may also be coupled to the subframe.

8 Claims, 46 Drawing Sheets

(51) Int. Cl.
*B60G 3/20* (2006.01)
*B60K 7/00* (2006.01)

(56) References Cited

U.S. PATENT DOCUMENTS

| | | | |
|---|---|---|---|
| 8,596,403 B2* | 12/2013 | Cunningham | B60K 1/00 180/300 |
| 8,720,636 B2* | 5/2014 | Akoum | B60K 1/00 180/299 |
| 8,864,153 B2* | 10/2014 | Luttinen | B60G 3/20 280/93.507 |
| 9,030,063 B2* | 5/2015 | Rawlinson | F16H 57/0476 310/52 |
| 9,045,170 B2* | 6/2015 | Rumpel | B60G 3/20 |
| 9,387,751 B2* | 7/2016 | Kashiwai | B60K 1/00 |
| 9,505,441 B2* | 11/2016 | Merkel | B60K 1/00 |
| 9,540,046 B2* | 1/2017 | Kramer | B60G 21/0555 |
| 9,649,923 B2* | 5/2017 | Perlo | B60L 53/80 |
| 9,692,277 B2* | 6/2017 | Pearce, Jr | B60L 58/26 |
| 9,873,455 B2* | 1/2018 | Buschjohann | B62D 21/03 |
| 10,457,330 B2* | 10/2019 | Perlo | B62D 33/044 |
| 10,696,149 B2* | 6/2020 | Pearce, Jr | B60L 3/0061 |
| 2003/0230443 A1* | 12/2003 | Cramer | B60G 3/20 180/65.51 |

* cited by examiner

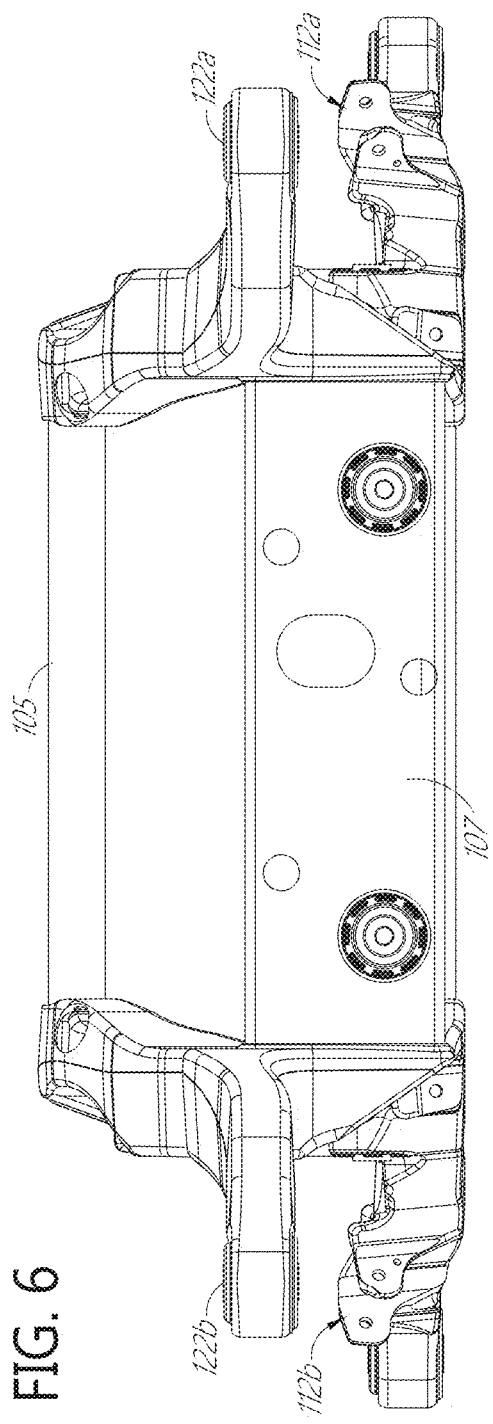
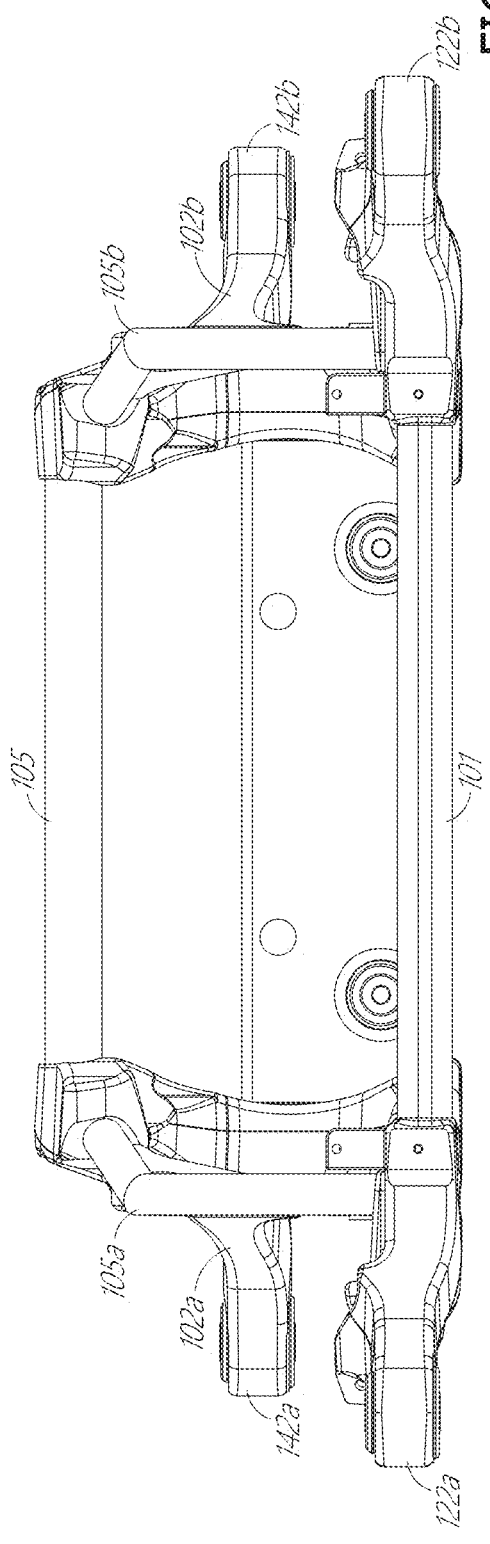

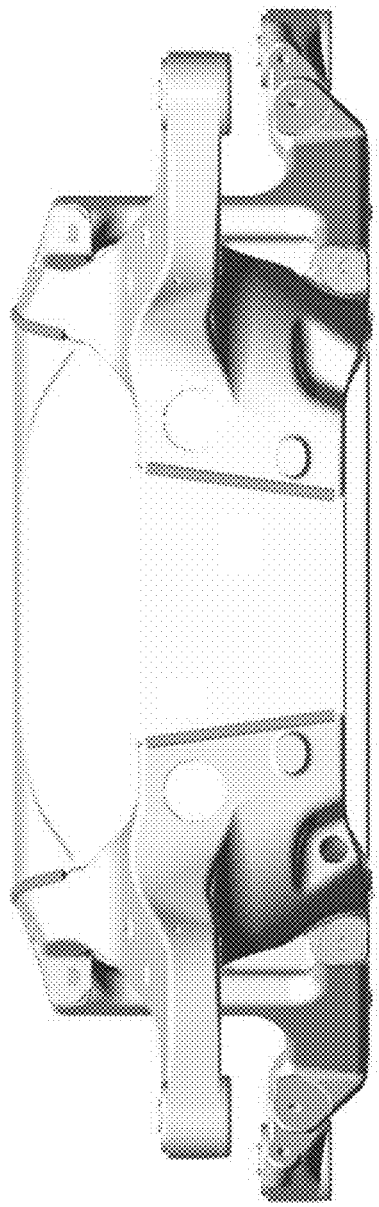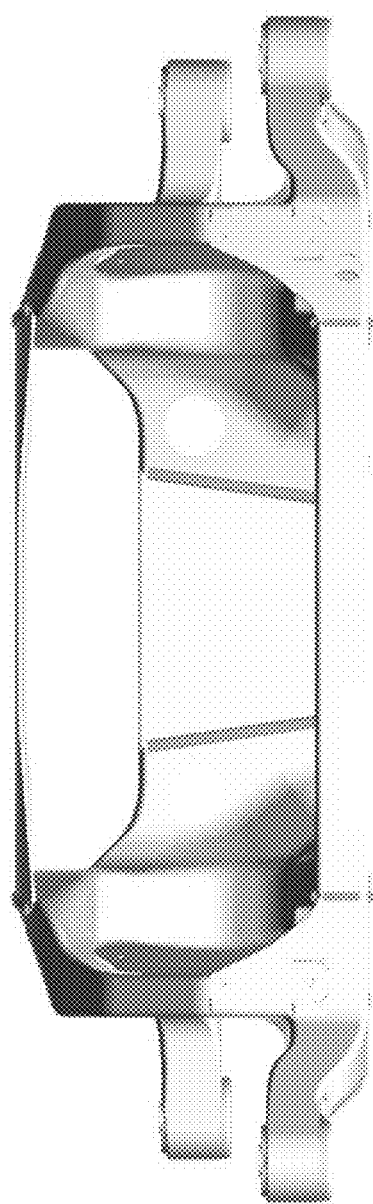
FIG. 32
FIG. 33

SUBFRAME AND SUSPENSION ASSEMBLY

CROSS-REFERENCE TO RELATED APPLICATIONS

This application claims the benefit of U.S. Provisional Application No. 62/373,213, filed Aug. 10, 2016, the entirety of which is hereby incorporated by reference.

BACKGROUND

Field

The present disclosure is generally directed to automotive subframe and suspension assemblies. More particularly, disclosed herein is a rear subframe for an electric vehicle capable of housing one or two electric motors for an electric vehicle. Additional components such as invertors may also be housed within the subframe. A rear suspension and steering system may also be included.

Description of the Related Art

Subframes may be used to protect and isolate the motor from the main vehicle frame. Such subframes may improve safety and reduce vibrations. Independent suspensions systems allow for each wheel of the vehicle to move independently of one another. Active adjustment of the rear wheels reduces a vehicle's turning radius and stabilizes vehicle handling at high speeds.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

In some implementations, a system for housing at least one an electric motor in an electric automobile includes a rear subframe. The subframe may include at least two castings extending in a longitudinal direction and spaced apart from one another in a lateral direction. The at least two castings may be coupled together by a laterally extending front cross-car extrusion and a laterally extending rear cross-car extrusion. The rear cross-cross car extrusion may be spaced away from the front cross-car extrusion in the longitudinal direction to define an area that is bounded by the at least two castings, the laterally extending front cross-car extrusion, and the laterally extending rear cross-car extrusion. A laterally extending roll bar may be coupled to the at least two castings and positioned over the area to define a motor receiving volume configured to receive at least one motor inserted over the front cross-car extrusion. At least two braces may be removably couplable to the subframe. The at least two braces may be configured to prevent removal of a motor inserted over the front cross-car extrusion when the at least two braces are coupled to the subframe.

In some aspects, the at least two castings include at least a portion of a motor mount configured secure the motor with respect to the castings. A rear steering actuator may be coupled to the rear cross-car extrusion. Two laterally extending track rods may be coupled to opposite sides of the rear steering actuator. The track rods may include at least one section that curves in the longitudinal direction. The track rods may be coupled to two different knuckles with a pin that extends upward through an underside of the knuckle. A lower semi-trailing arm may be hingedly connected to each casting and may support an air spring from below. Two upper control arms may be hingedly connected to each casting and may extend laterally away from the casting and positioned in-line with the cross-car roll bar when viewed from above.

In some implementations, a rear subframe and rear steering assembly system includes at least two castings extending in a longitudinal direction and spaced apart from one another in a lateral direction. The at least two castings may be coupled together by a laterally extending front cross-car extrusion and a laterally extending rear cross-car extrusion. The rear cross-cross car extrusion may be spaced away from the front cross-car extrusion in the longitudinal direction to define an area that is bounded by the at least two castings, the laterally extending front cross-car extrusion, and the laterally extending rear cross-car extrusion. A laterally extending roll bar may be coupled to the at least two castings and positioned over the area to define a motor receiving volume configured to contain at least one motor. A rear steering actuator may be mounted to a rear facing surface of the rear cross-cross car extrusion.

In some aspects, two track rods are coupled to opposite sides of the rear steering actuator and extend laterally away from the rear steering actuator. The track rods may include at least one curved section extending in the longitudinal direction. The two track rods may each be coupled to two different knuckles with a pin that extends upward through an underside of the knuckle. The steering knuckles may include a wheel mount. In some aspects, the track rods are coupled to the steering knuckles at a location below the center of the wheel mount when the viewed in the lateral direction. The steering knuckles may include a rear lever portion extending in the longitudinally direction and coupled to one of the track rods. The steering knuckles may be coupled to the castings with at least one lower semi-trailing arm. A wind-up link may connect the steering knuckle to the lower semi-trailing arm. The wind-up link may be positioned behind the rear lever portion of the knuckle when the viewed in the lateral direction.

In some implementations a method of installing an electric motor in a rear subframe includes inserting at least one electric motor into a front side of a rear subframe configured to at least partially surround the electric motor on all sides except for the front side. The method may include securing at least two braces to the subframe to close the front end and at least partially surround the electric motor on all sides. The method may include securing the electric motor to at least a portion of a motor mount that is built into the subframe.

BRIEF DESCRIPTION OF THE DRAWINGS

The following is a brief description of each of the drawings. From figure to figure, the same reference characters have been used to designate the same components of an illustrated embodiment. The drawings disclose illustrative embodiments and particularly illustrative implementations in the context of an electric automobile. They do not set forth all embodiments. Other embodiments may be used in addition to or instead. Conversely, some embodiments may be practiced without all of the details that are disclosed.

It is to be noted that the figures provided herein are not drawn to any particular proportion or scale, and that many variations can be made to the illustrated embodiments. Brief introductions to some of the features, which are common to the described embodiments, are now described.

FIG. 6 is a rear view of the subframe of FIG. 1.

FIG. 7 is a front view of the subframe of FIG. 1.

FIG. 32 is a rear view of the subframe of FIG. 27.

FIG. 33 is a front view of the subframe of FIG. 27.

DETAILED DESCRIPTION

Disclosed herein is a subframe assembly for housing one or two relatively large electric motors. As such, the same subframe may be used for various models of electric vehicles. For example, a single motor may be mounted in the subframe for one line of production vehicles and a second, higher performance line of production vehicles, may include two motors mounted within the same subframe. The subframe may be mounted into various vehicle frames. In this way, a more modular vehicle construction may be possible. In embodiments with a single motor, a differential may also be housed within the subframe. The motor(s) may include gear sets.

The subframe may include a substantially unitary construction. For example, the subframe may include very few parts that are not bonded or welded together. For example, the subframe may include at least two longitudinal members that are joined together with two or more lateral, cross-car members that are welded to the longitudinal members. Such a unitary construction may increase the strength of the subframe and protect the motors within the subframe. Such a construction may also provide the relatively large space required for two large rear motors, two gear sets, and two invertors. In some aspects, the subframe is configured to contain the motor and other components within the subframe during collisions. The subframe may surround the drive train components and protect the drive train components from impacts in multiple directions and during roll-overs.

Figure 27:
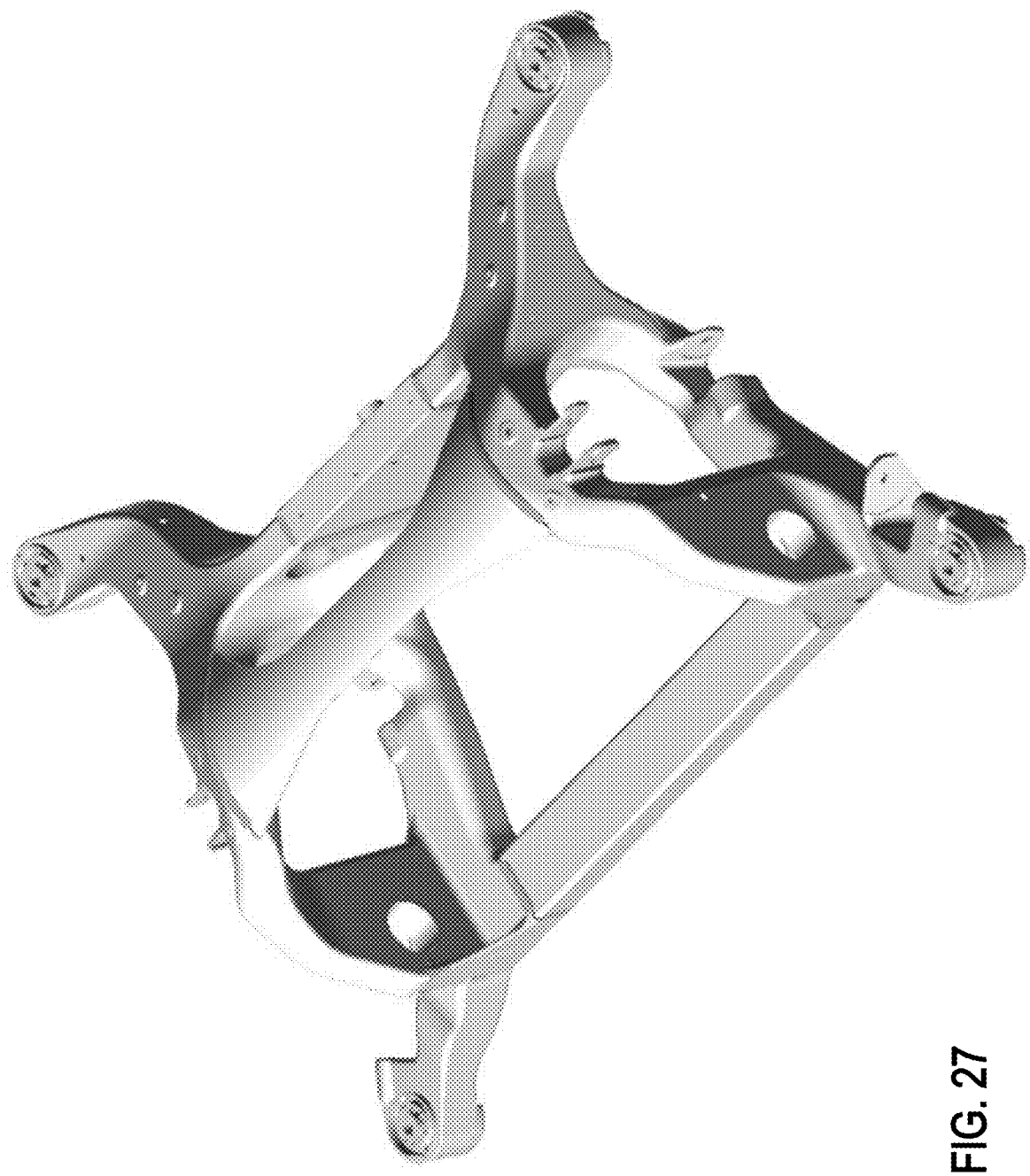
FIG. 27 is front top perspective view of an alternative subframe, similar to the subframe shown in FIG. 1 according to one implementation.
Figure 28:
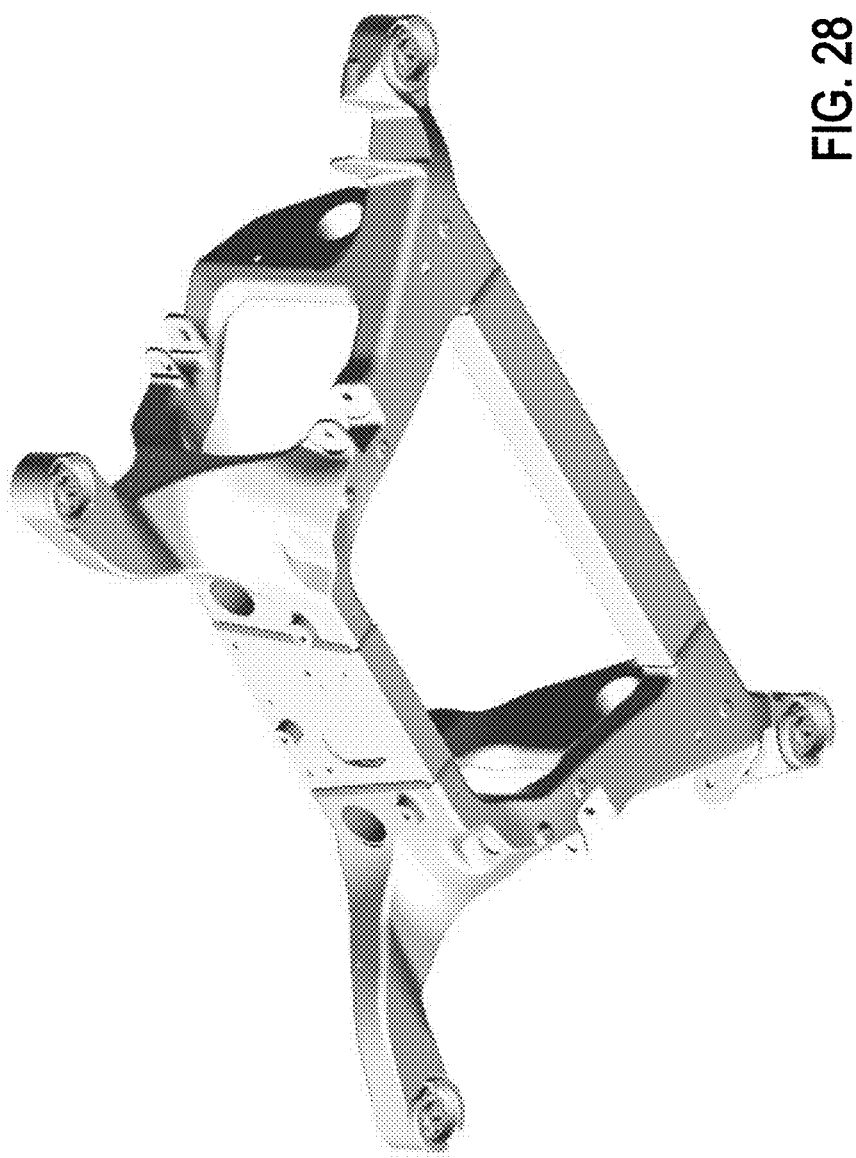
FIG. 28 is rear bottom perspective view of the subframe of FIG. 27.
Figure 29:
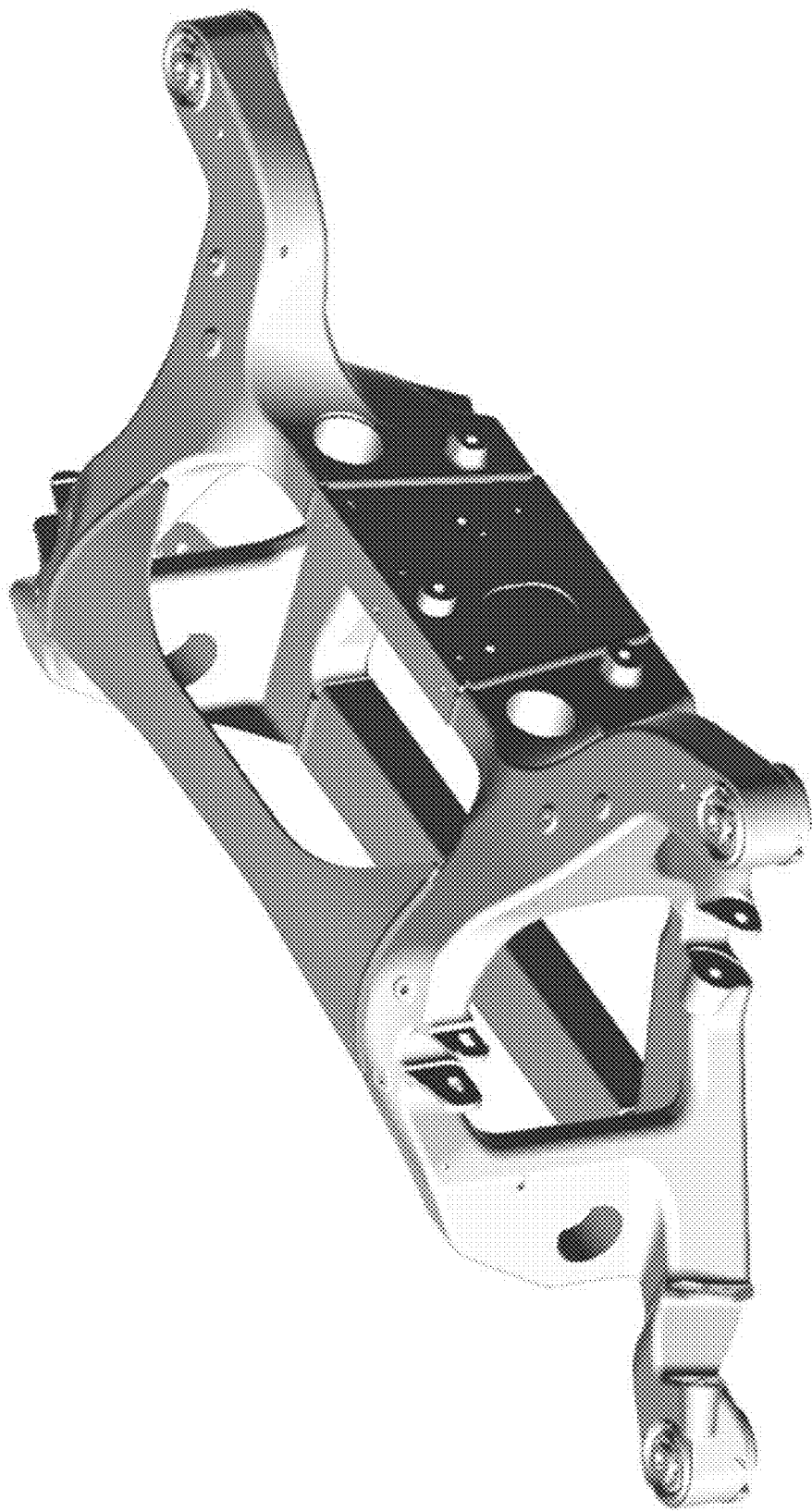
FIG. 29 is rear perspective view of the subframe of FIG. 27.
Figure 30:
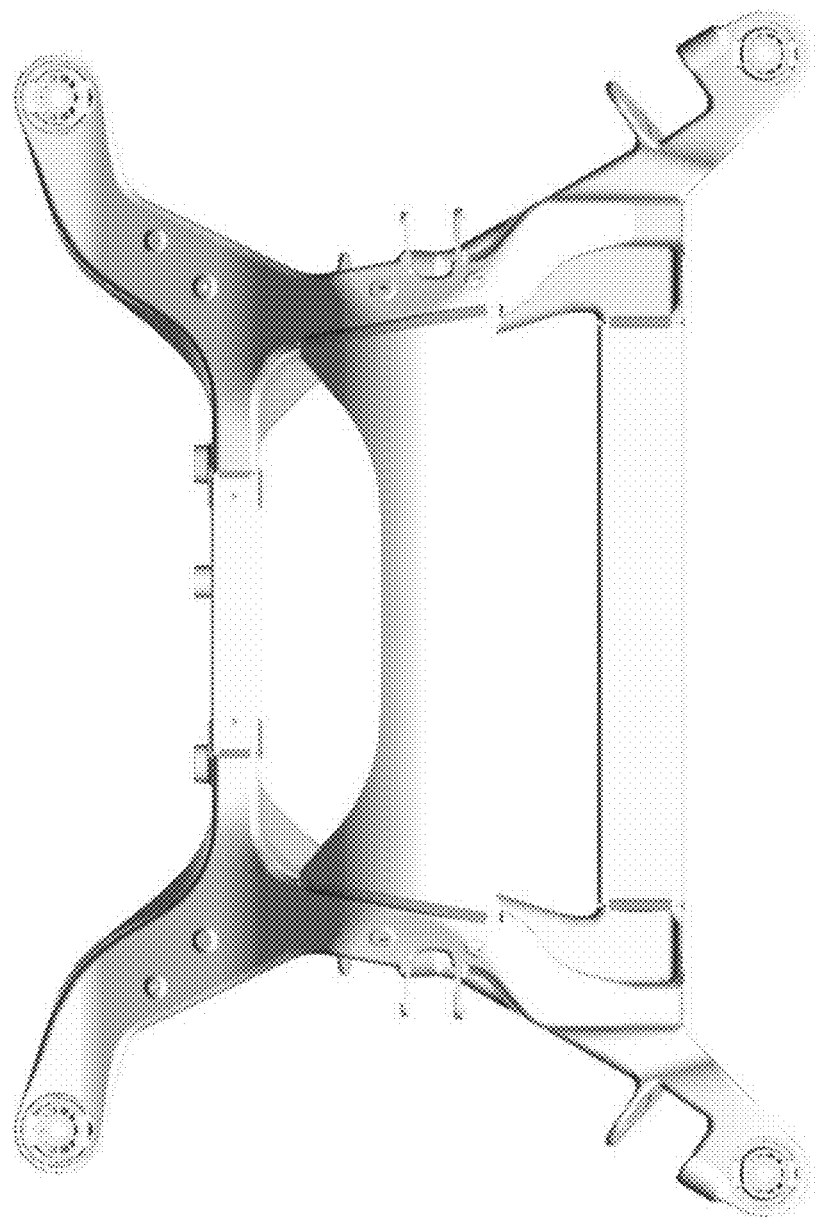
FIG. 30 is an overhead view of the subframe of FIG. 27.
Figure 31:
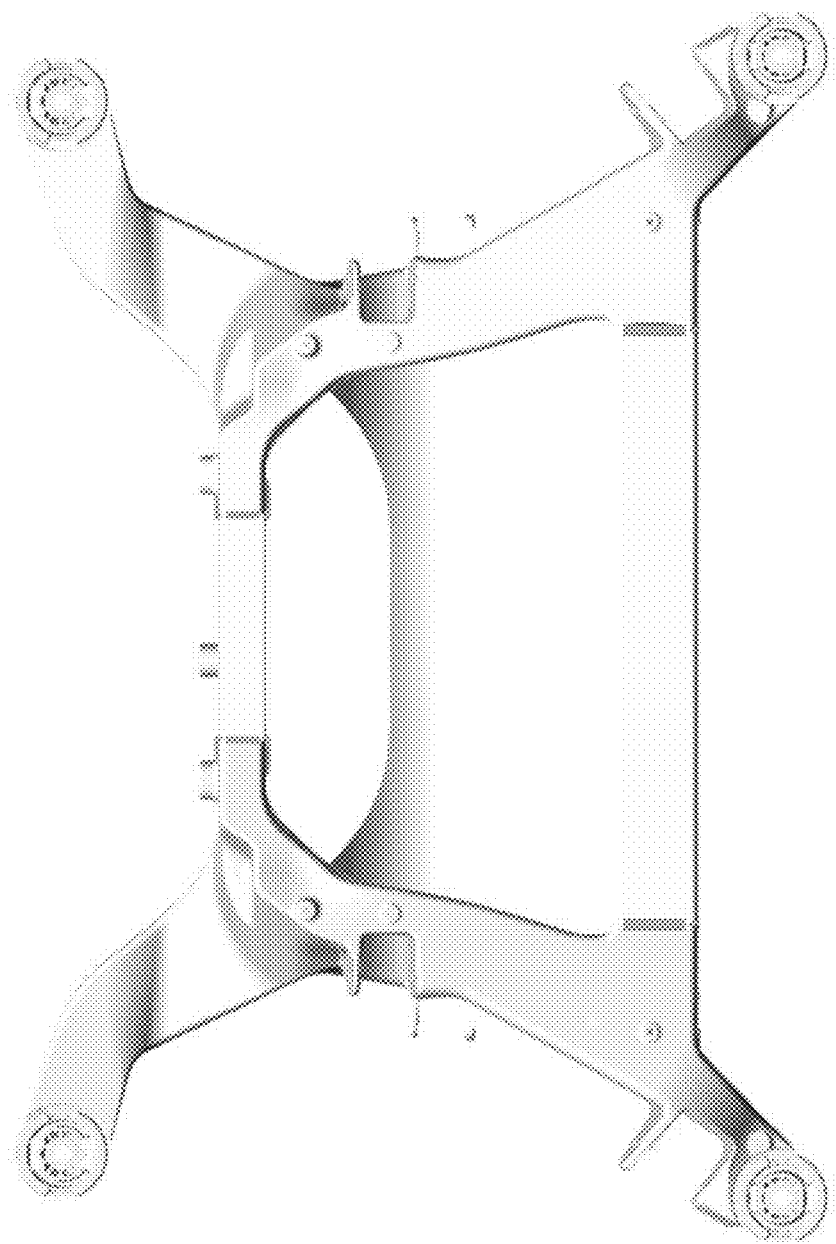
FIG. 31 is an underside view of the subframe of FIG. 27.
Figure 34:
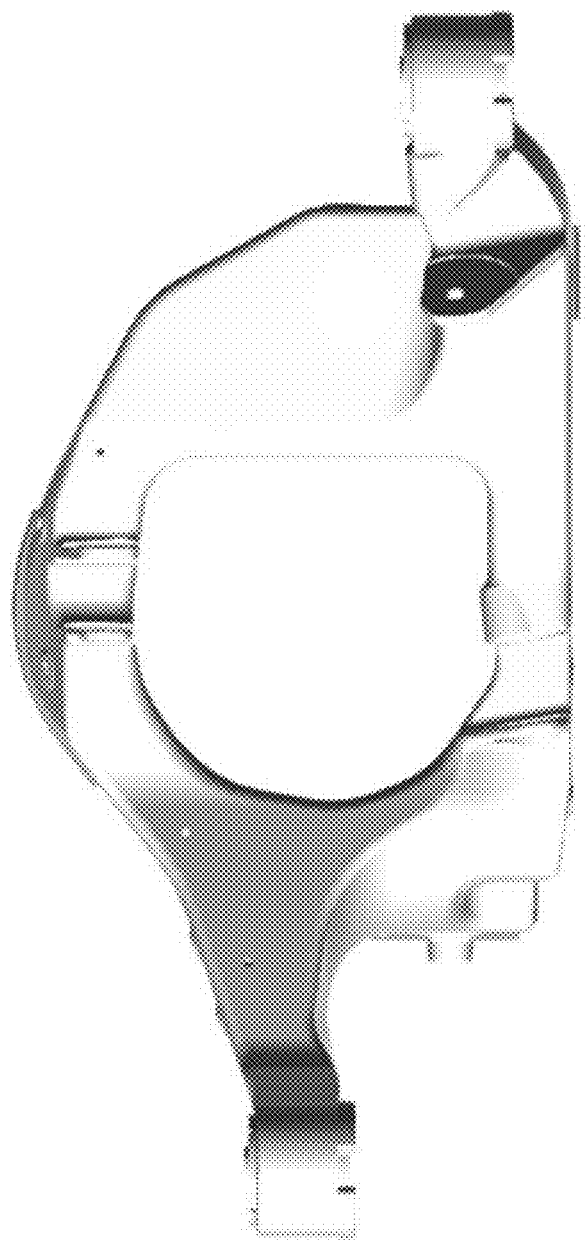
FIG. 34 is a right side view of the subframe of FIG. 27.
Figure 35:
FIG. 35 is the same as FIG. 27 with additional components coupled to the subframe, which may be coupled to a drive system (not shown) as similarly shown and described with respect to FIG. 13.
Figure 36:
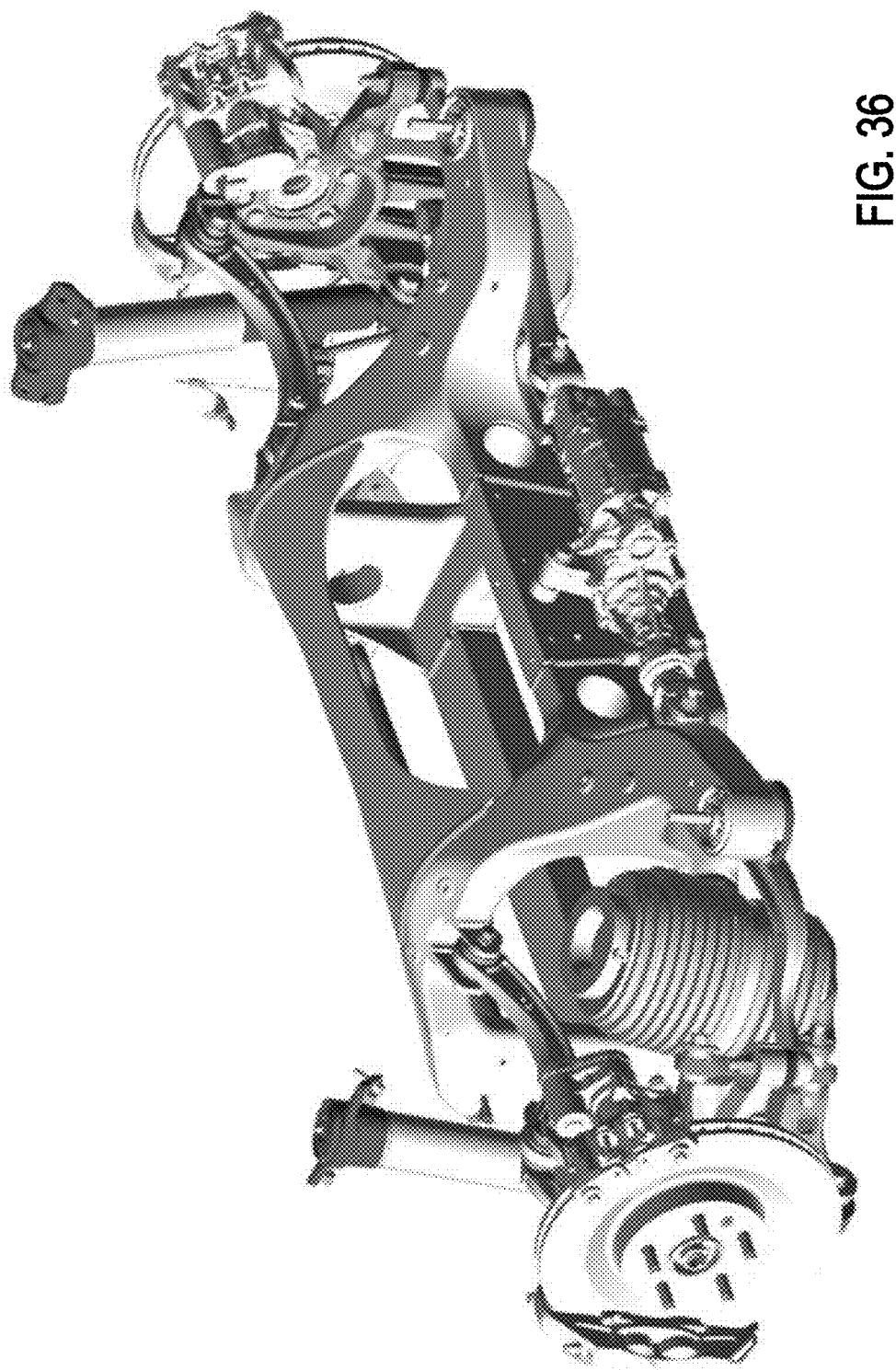
FIG. 36 is a rear perspective view of FIG. 35.
Figure 37:
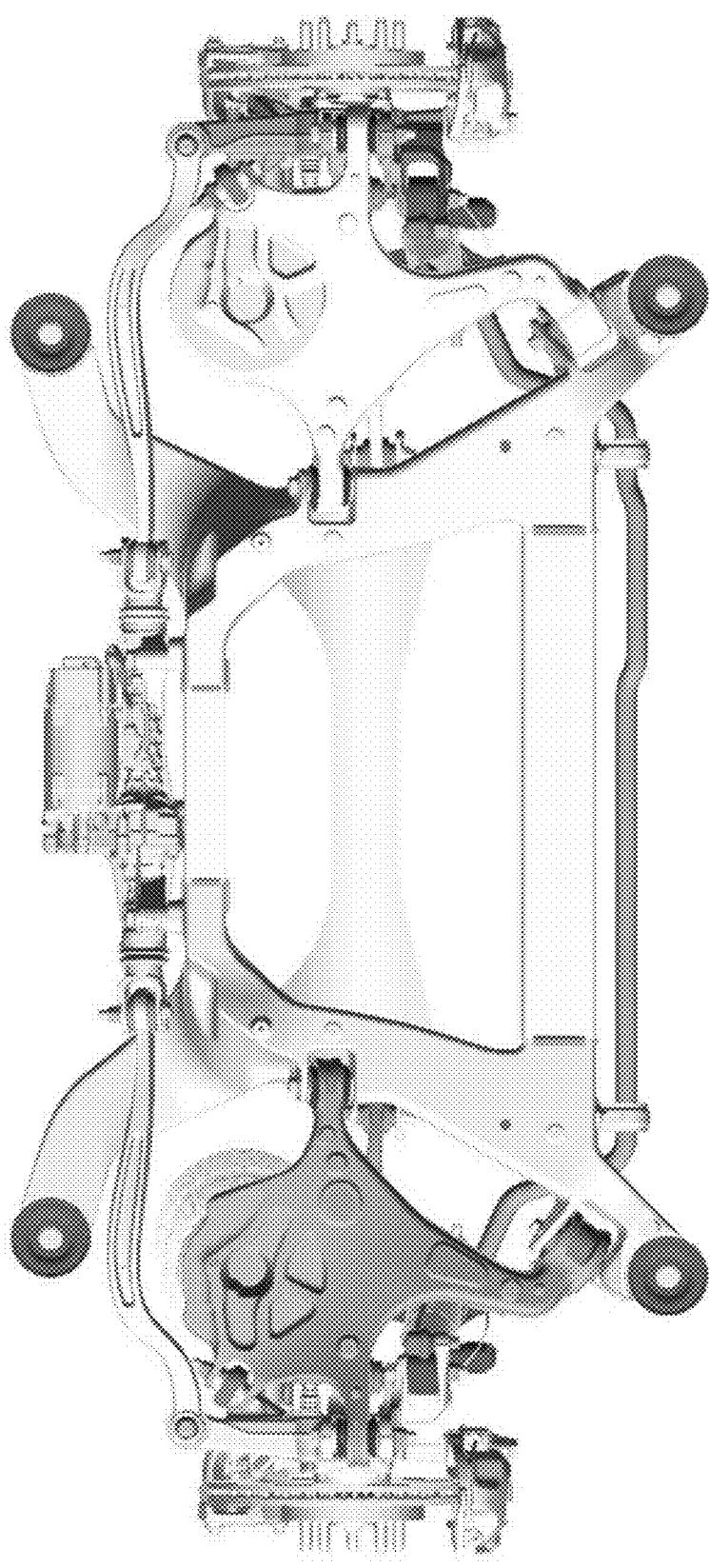
FIG. 37 is an underside view of FIG. 35.
Figure 38:
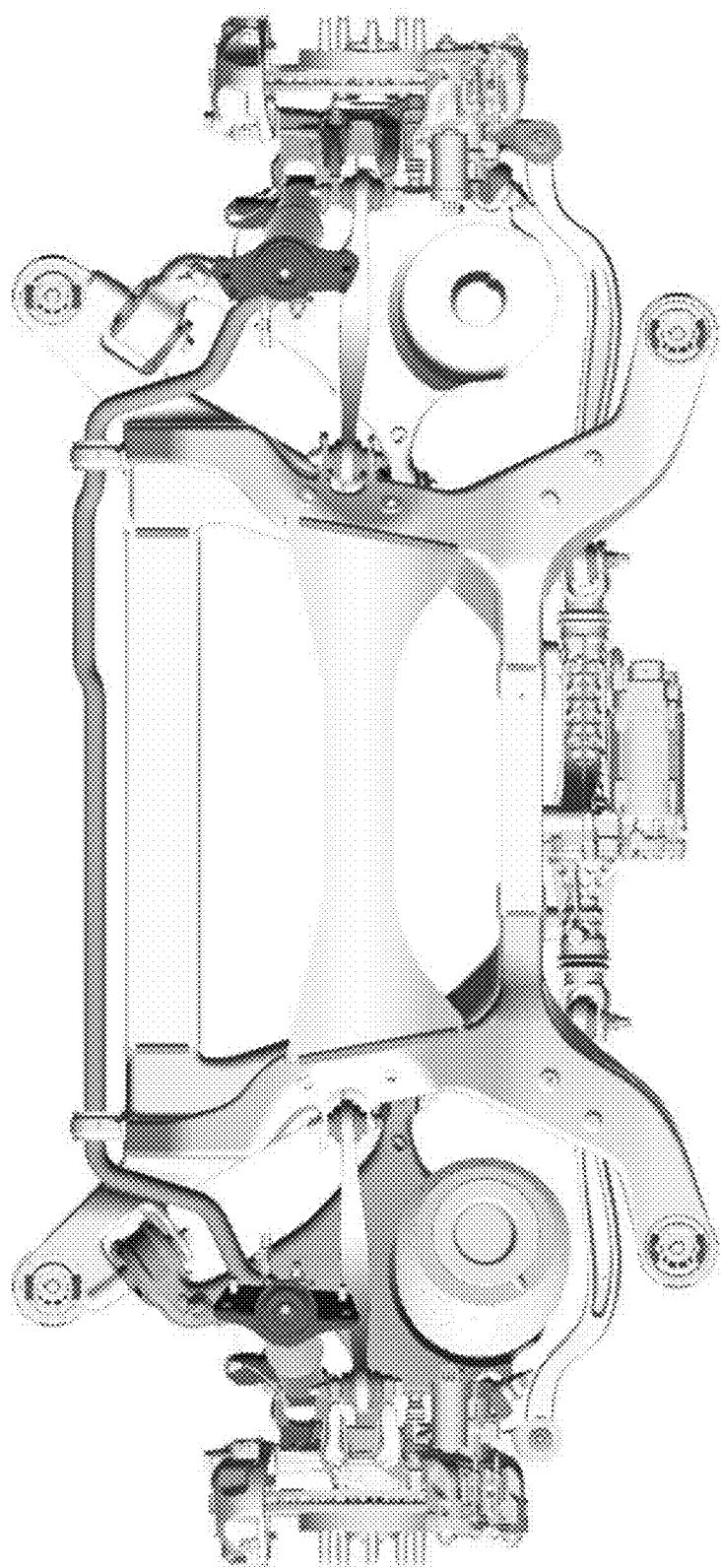
FIG. 38 is an overhead view of FIG. 35.
Figure 39:
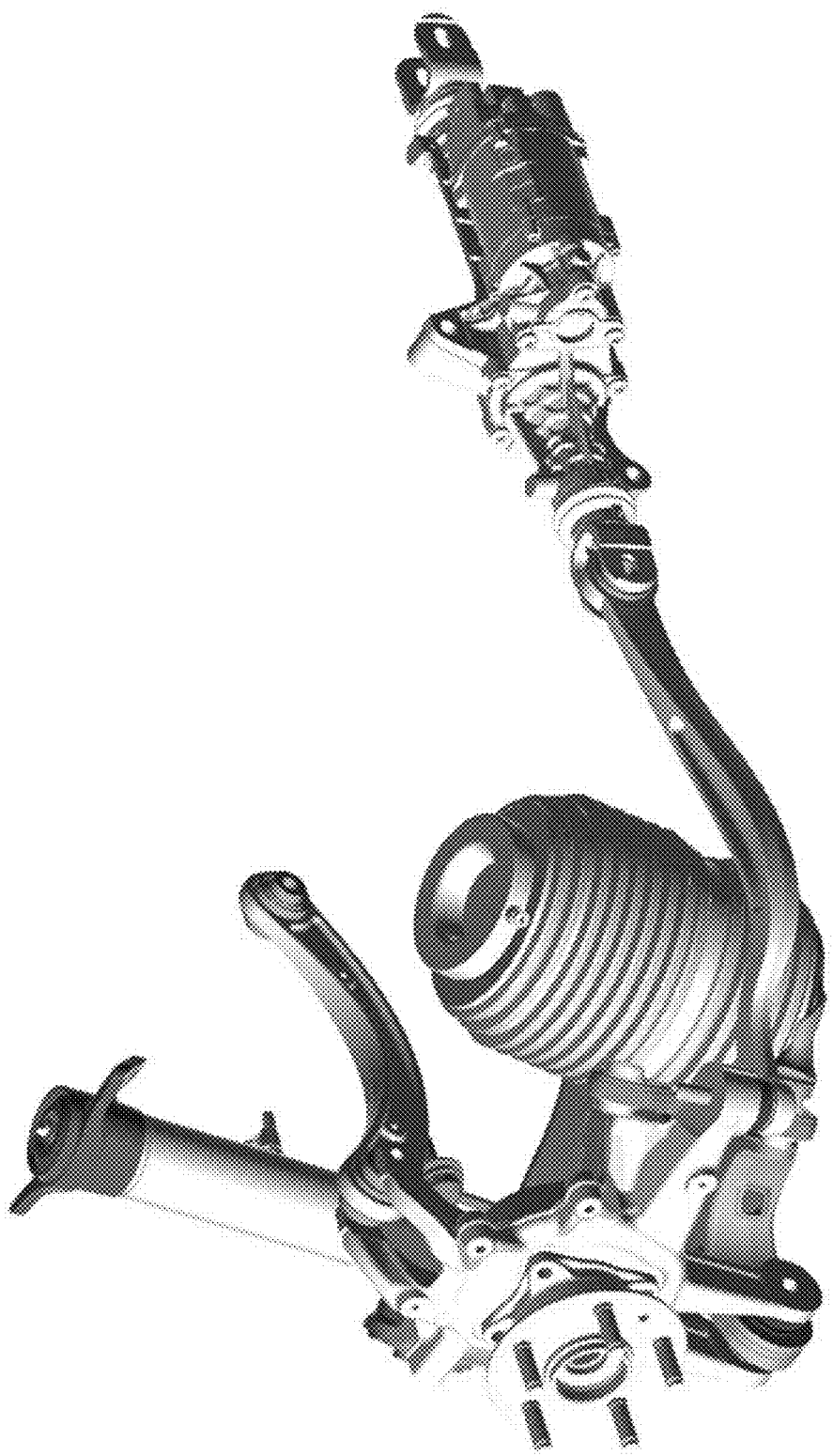
FIG. 39 is a perspective view of left side of the steering system and suspension system.
Figure 40:
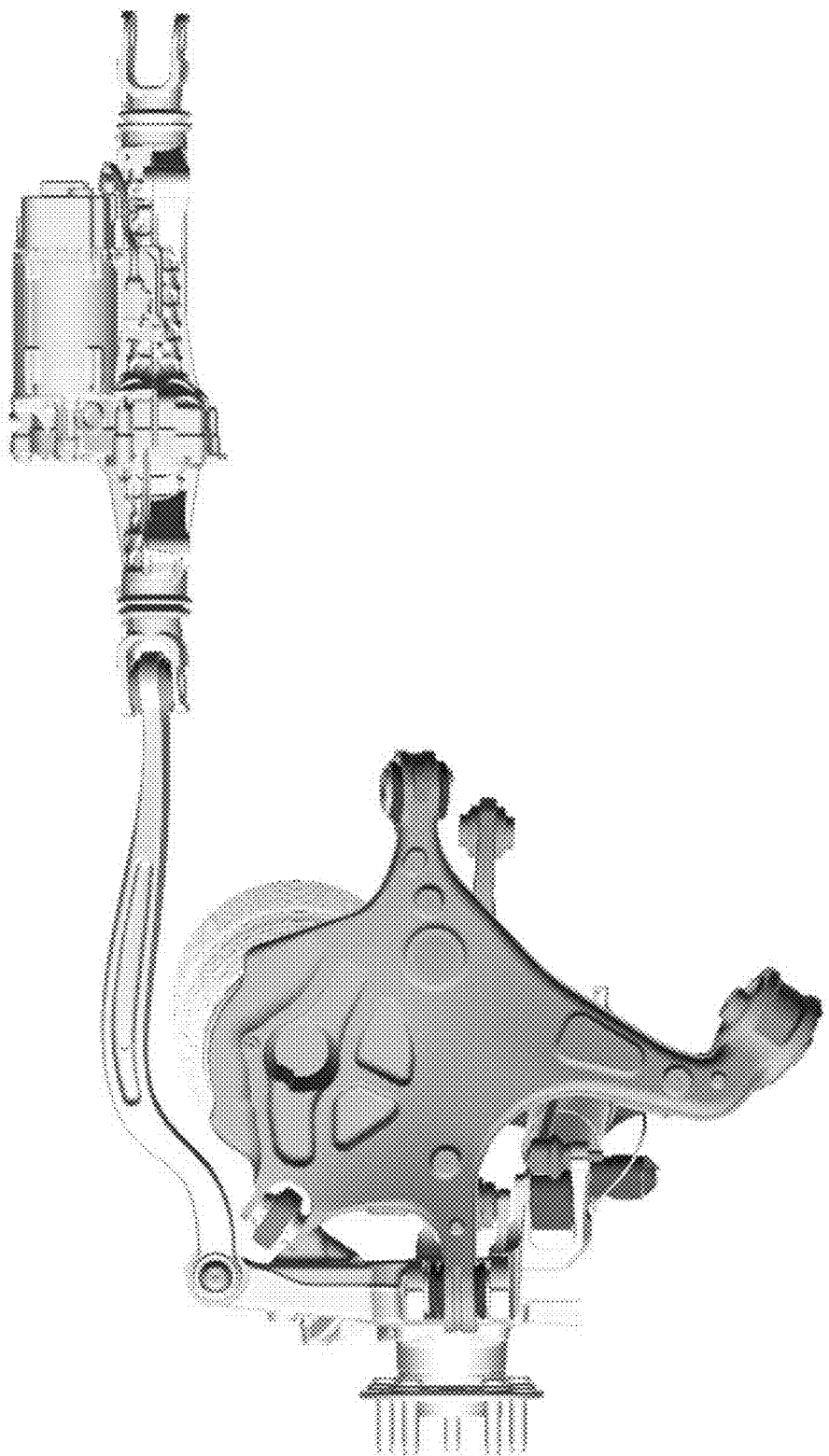
FIG. 40 is an underside view of FIG. 39.
Figure 41:
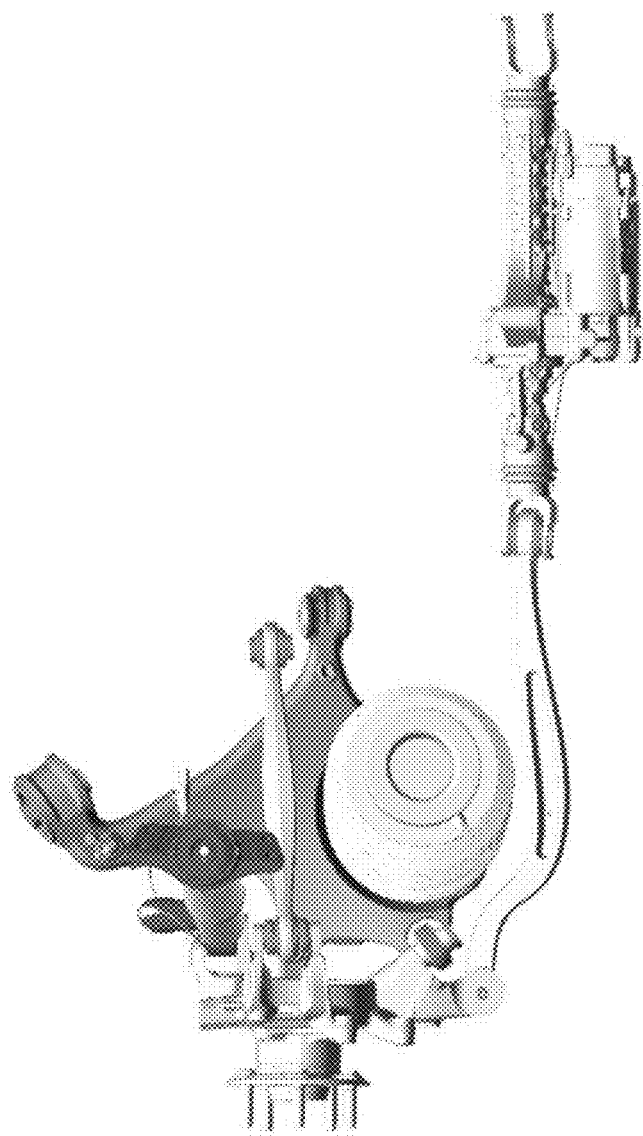
FIG. 41 is an overhead view of FIG. 39.
Figure 42:
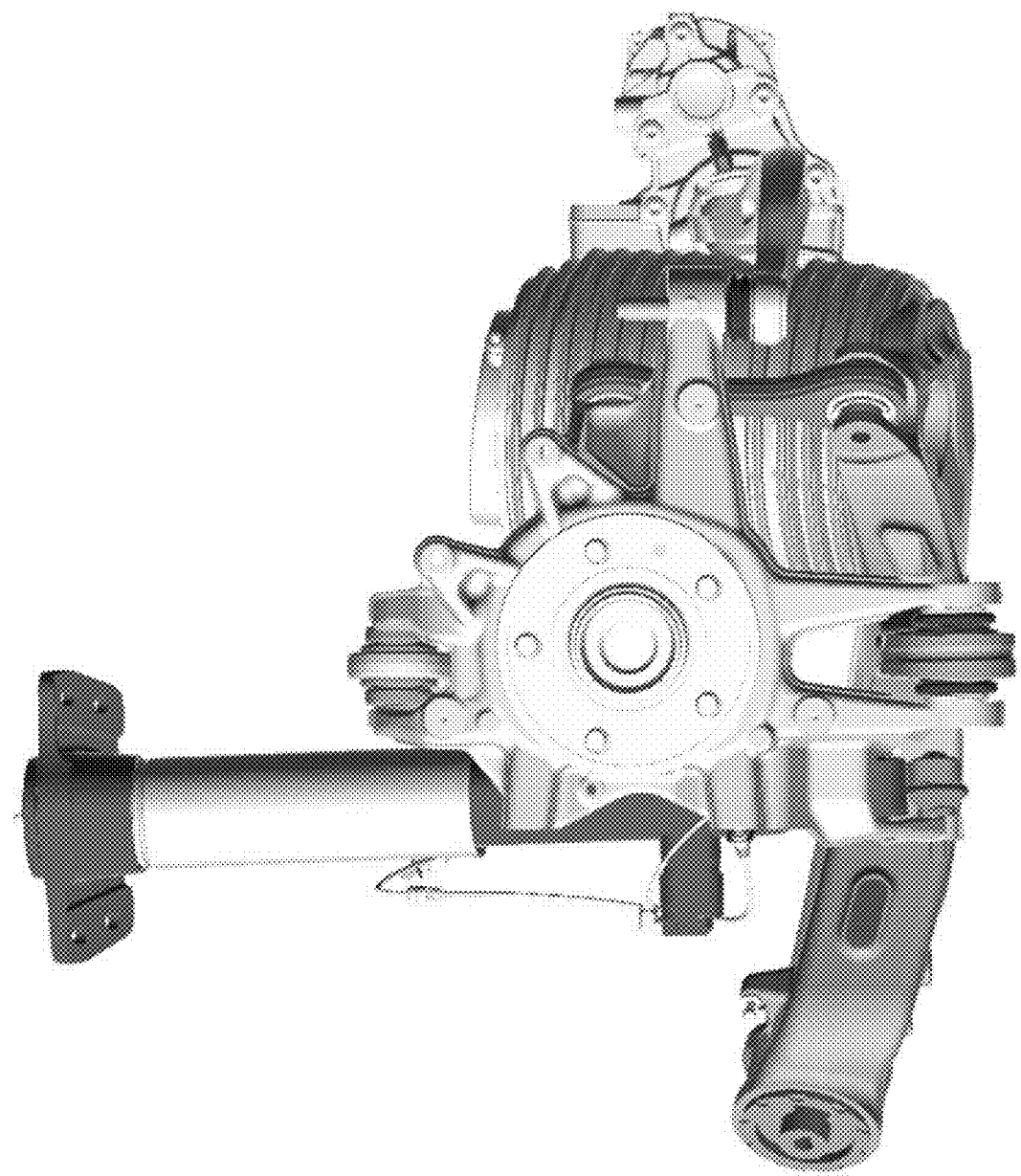
FIG. 42 is a head on view of FIG. 39.
Figure 43:
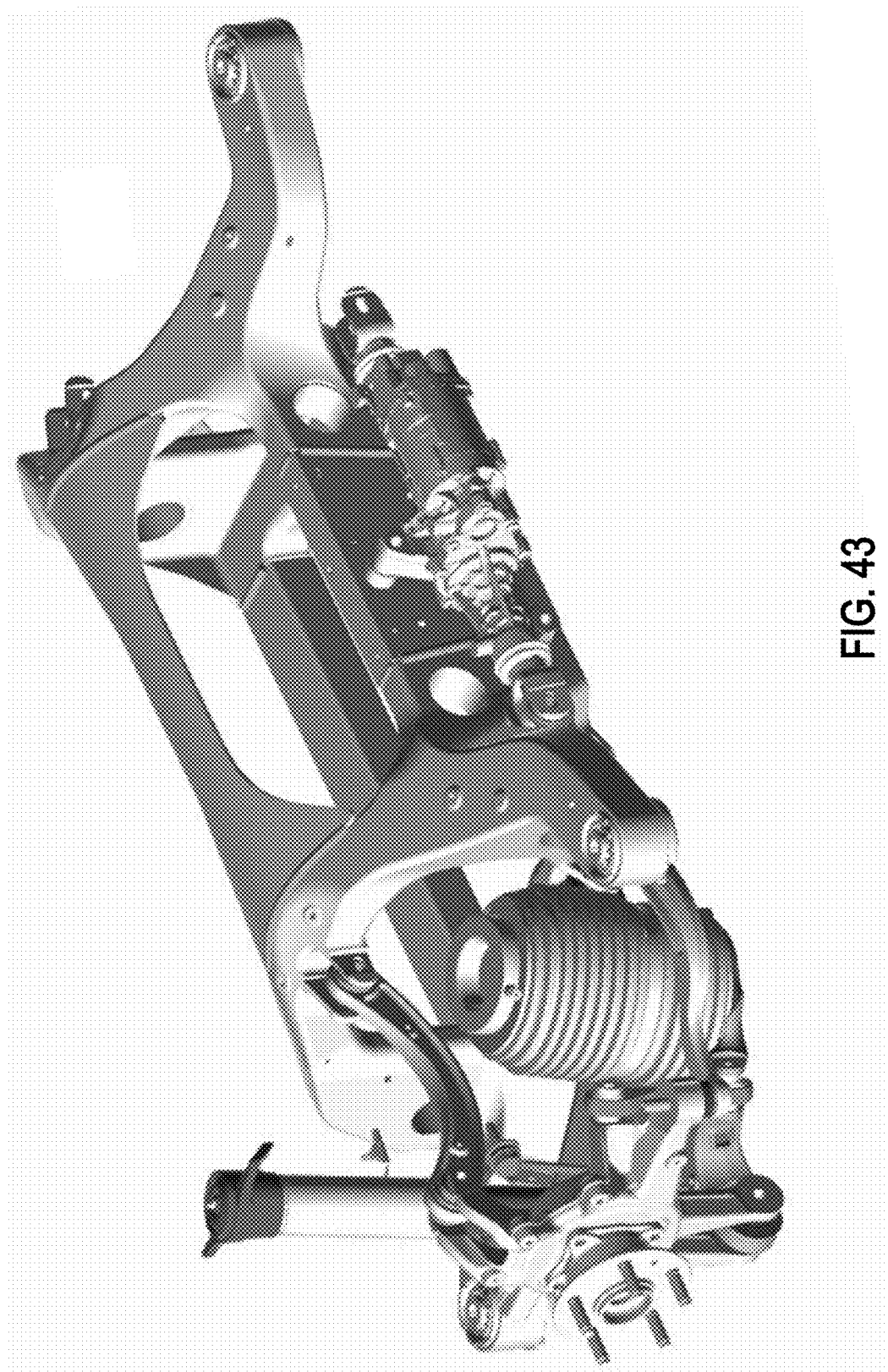
FIG. 43 is a rear perspective view of the steering system and suspension system of FIG. 39 coupled to the subframe of FIG. 27.
Figure 44:
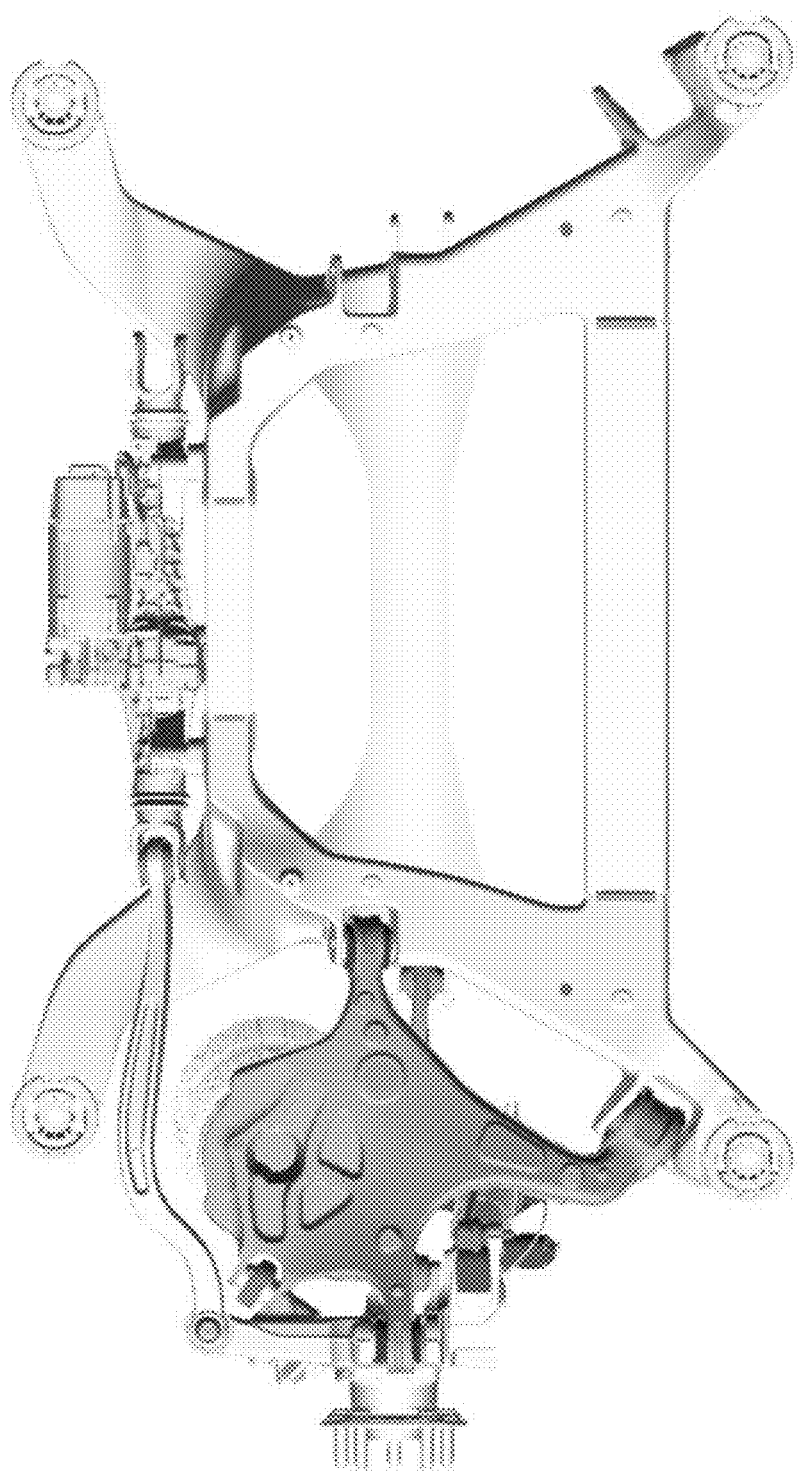
FIG. 44 is an underside view of FIG. 43.
Figure 45:
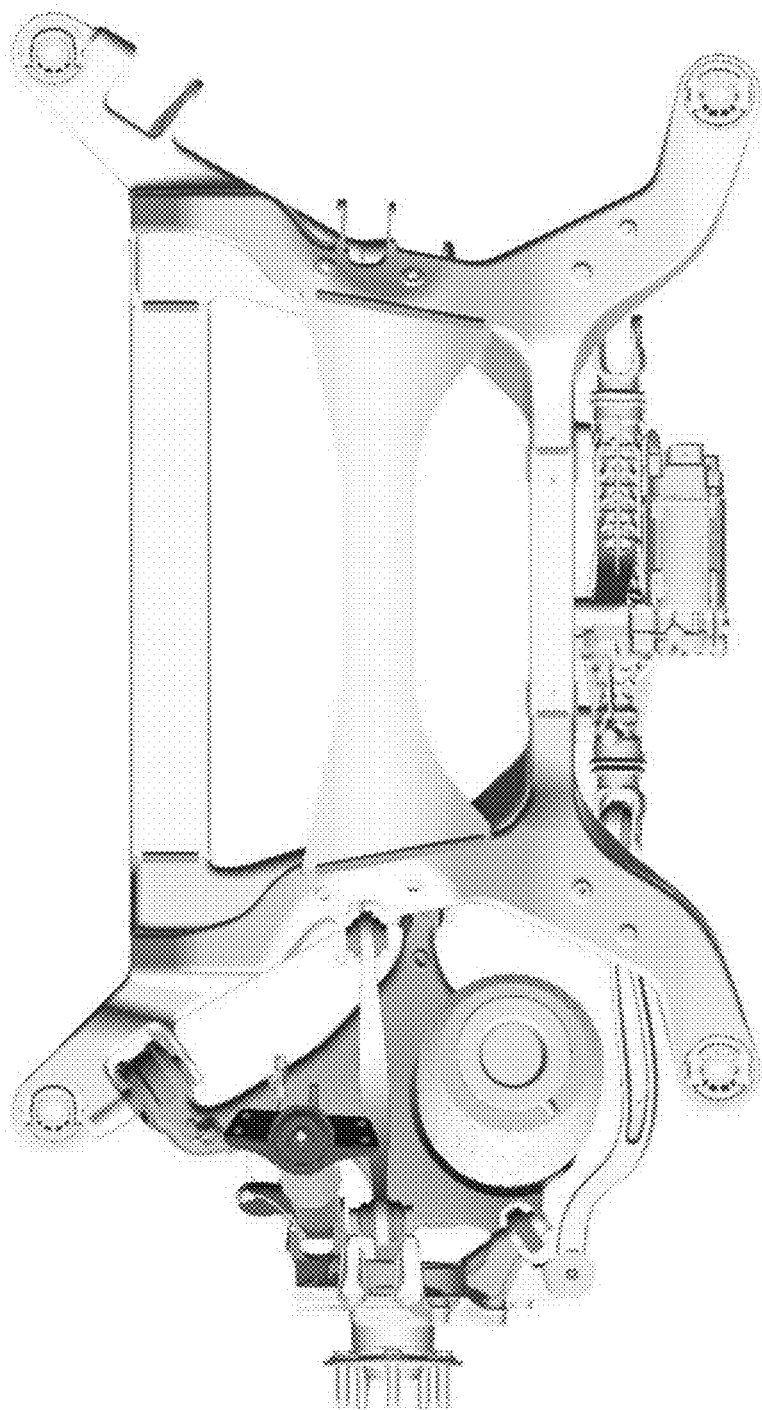
FIG. 45 is an overhead view of FIG. 43.
Figure 46:
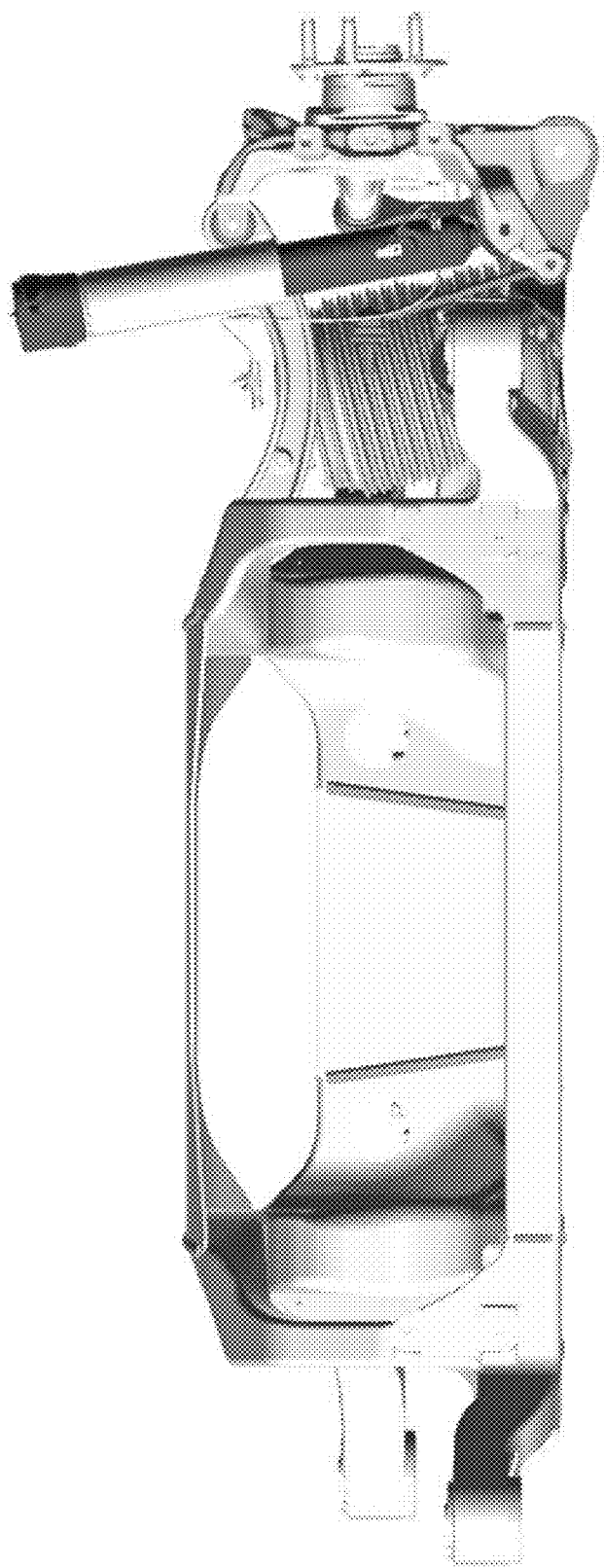
FIG. 46 is a front view of FIG. 43.
Figure 47:
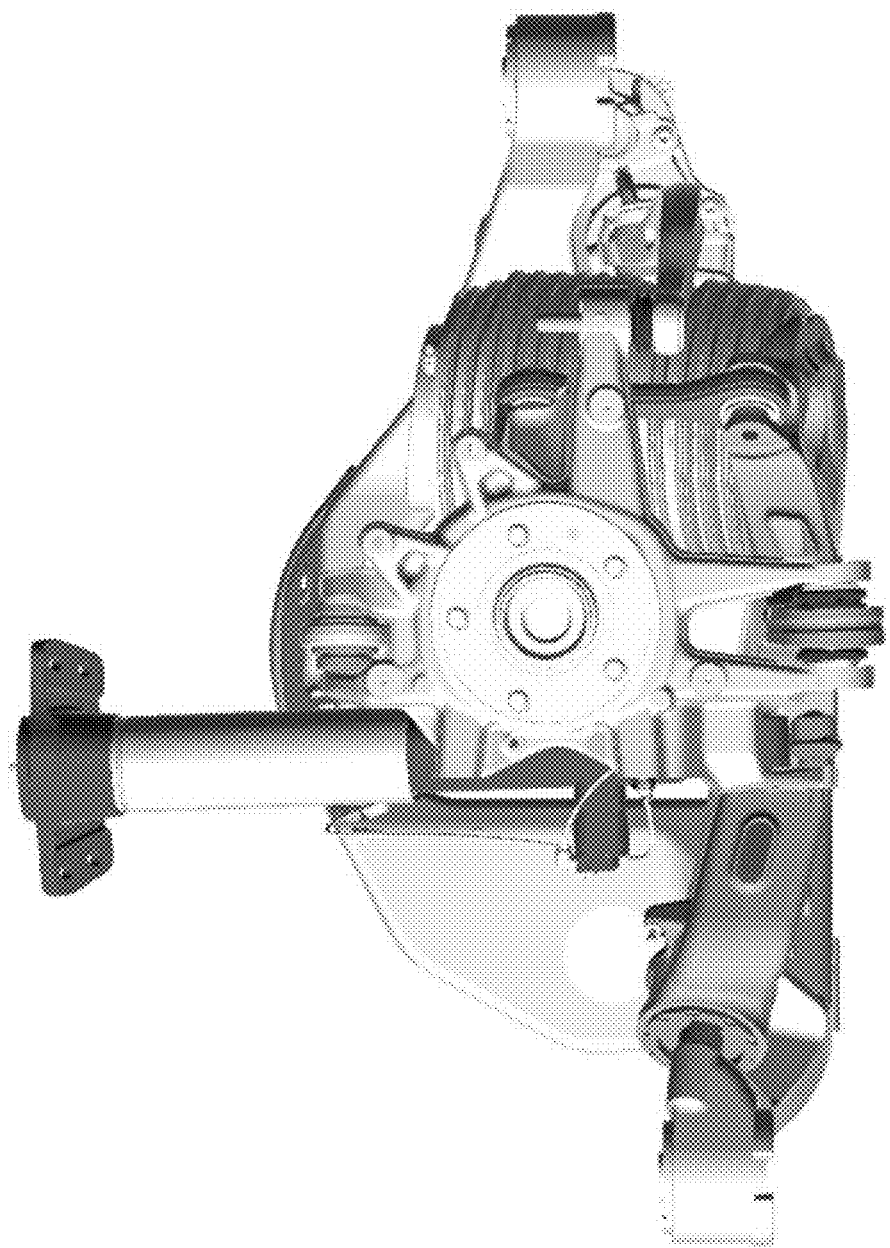
FIG. 47 is a head on view of FIG. 43.
Figure 48:
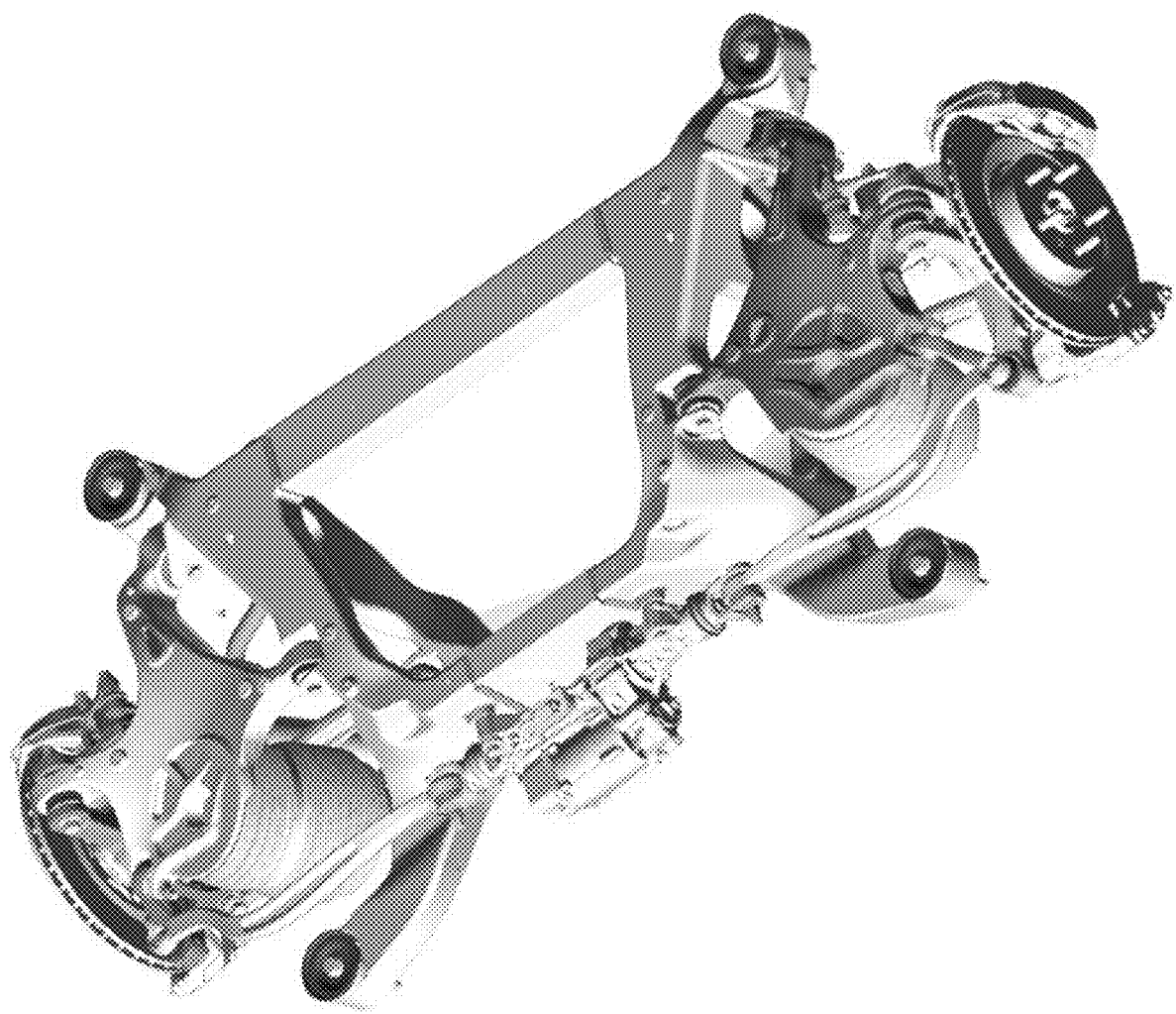
FIG. 48 is a partial perspective view of the subframe, steering system, and suspension system of FIG. 35, which may be coupled to a frame of a vehicle, as similarly shown in FIG. 26.

In some implementations, the subframe is configured such that the one or more motors are inserted into the front side of the subframe during a motor installation. Two or more bolt-in braces may then be installed to secure the motors within the subframe. After the bolt-in braces are installed, the subframe may substantially surround and house the one or more motors within the subframe. The bolt-in braces may be the only portions of the subframe that are easily removed and re-attached. In other implementations, for example, the implementation shown with respect to at least FIG. 27, the braces may be permanently affixed to the subframe, or formed as a solid pieces in conjunction with the subframe.

In some implementations, the subframe includes one or more built-in motor mounts. In this way, the motor(s) may be more easily installed and secured within the subframe. Thus, the present disclosure provides a means for securing one or more motors on and within the subframe. In some aspects, the subframe supports at least a portion of one or more motors from below. In some aspects, the subframe inhibits the movement of the one or motors in the lateral, longitudinal, and transverse directions.

The subframe may include at least one rear cross-car extrusion. Such a rear cross-car extrusion may increase the rigidity of the subframe. In some aspects, a rear steering actuator may be mounted on the rear cross-car extrusion. Thus, the cross-car extrusion may simplify manufacturing.

The subframe may include at least one rear cross-car roll bar that is configured to pass over at least a portion of at least one motor placed within the subframe when viewed from above. In some aspects, the subframe includes one front cross-car extrusion. A subframe constructed of just two uniquely shaped castings coupled together by only three cross-car members may provide a cost effective, easy to manufacture, and robust system for housing a drive train. Furthermore, the subframe may be configured such that a rear steering and suspension system may be easily attached thereto.

A suspension system may be coupled to the subframe. The suspension system may include semi-trailing arms that move at an angle to the vehicle's longitudinal axis as they deflect and rebound during driving. Such semi-trailing arms may improve handling during cornering.

In some aspects, an air spring is mounted to each semi-trailing arm. The air spring may be capable of adjusting the ride height of the vehicle and/or providing a smoother and more comfortable ride for the passengers. In some aspects, each semi-trailing arm may be configured to accommodate an air spring that is large enough to raise and lower the relatively heavy electric motor(s). Furthermore, the semi-trailing arm design disclosed herein allows for large air springs while at the same time attempts to minimize the size of the semi-trailing arms in at least the lateral direction.

The terms "upper," "lower," "top," "bottom," "underside," "upperside" and the like, which may be used to describe the components described herein, are used in reference to the illustrated orientation of the embodiment. The "front" of the subframe 100 generally refers to the left hand side of the subframe 100 positioned in the orientation in FIG. 1. The "rear" of the subframe 100 generally refers to the right hand side of the subframe 100 positioned in the orientation in FIG. 1.

The foregoing description and claims may refer to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled to another element/feature. Thus, although the various schematics shown in the figures depict example arrangements of elements and components, additional intervening elements, devices, features, or components may be present in an actual embodiment (assuming that the functionality is not adversely affected). Furthermore, various solutions, other than those expressly described herein may be used to mechanically couple the disclosed components. Such couplings include ball and socket joints, hinges, universal joints, swivel joints, and the like.

FIGS. 1-8 illustrate an exemplary implementation of a subframe 100. To assist in the description of the subframe 100 and related components, the following coordinate system may be used (see, e.g., FIG. 1). A "longitudinal axis" is generally parallel to a length-wise axis extending from the rear of the subframe 100 to the front of the subframe 100. The "longitudinal direction" refers to a direction substantially parallel to the longitudinal axis. When installed in a vehicle, the subframe 100 would travel in the forward direction from right to left in FIG. 1, along the longitudinal axis.

Figure 1:
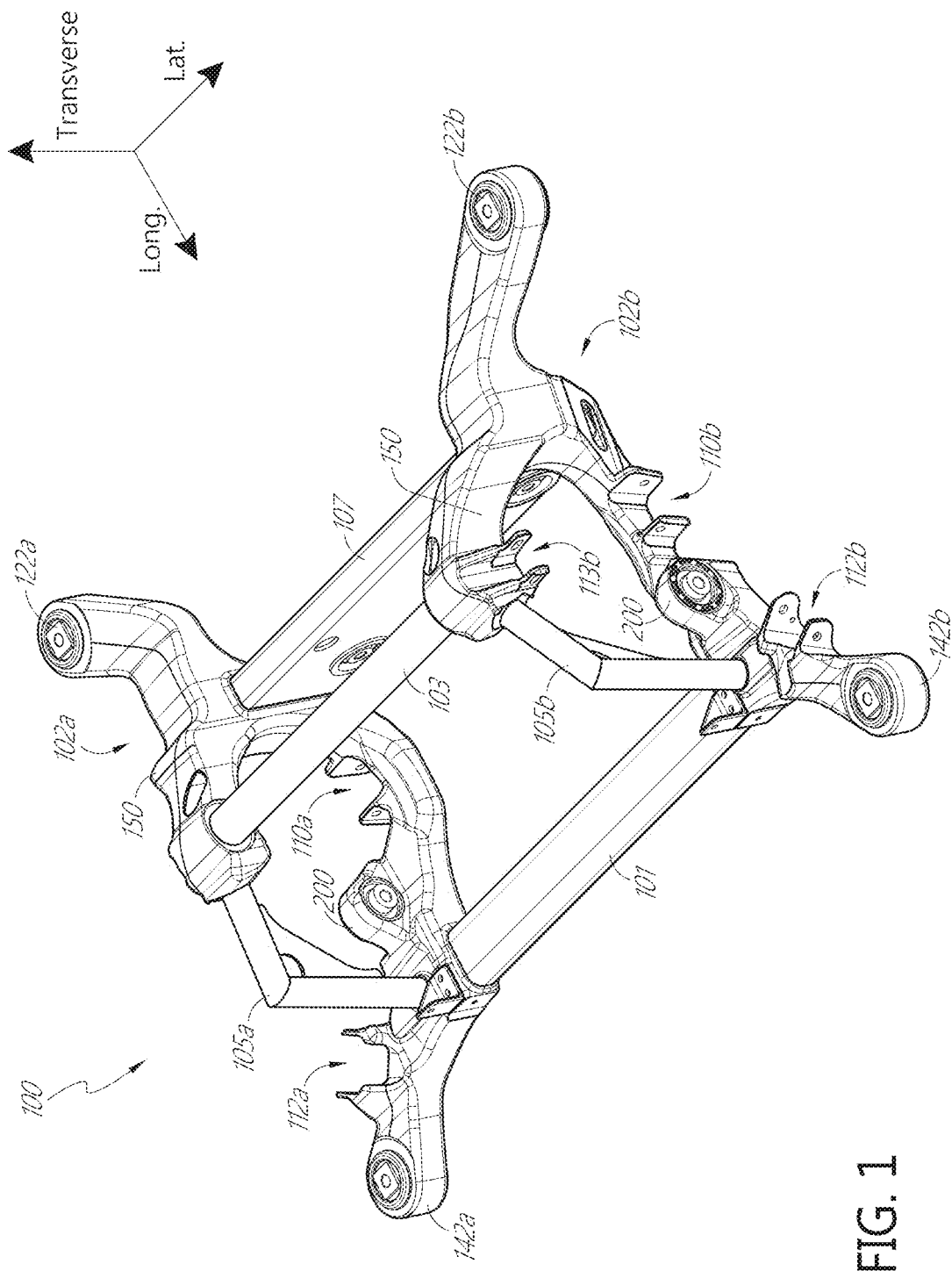
FIG. 1 is front top perspective view of a subframe according to one implementation.
Figure 2:
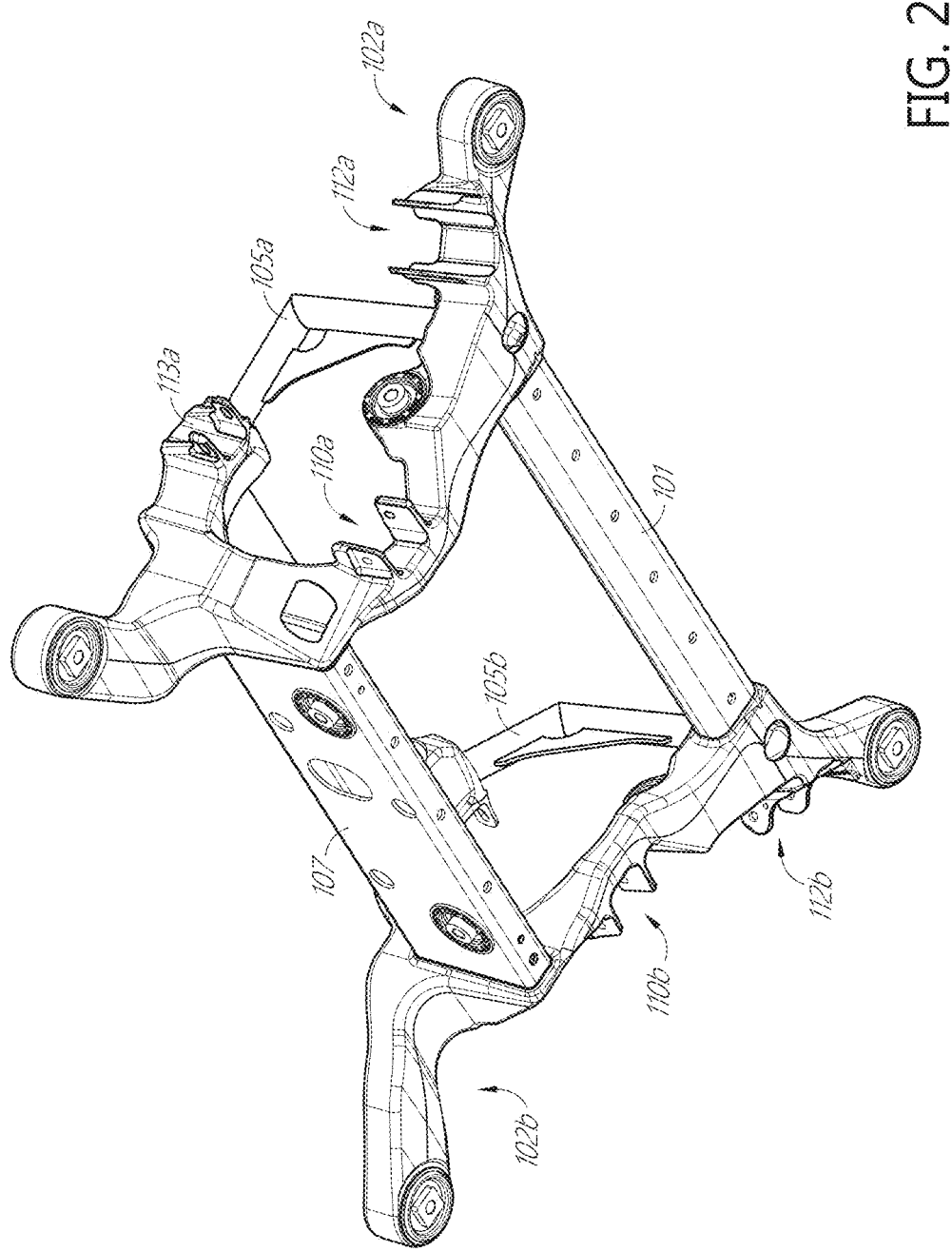
FIG. 2 is rear bottom perspective view of the subframe of FIG. 1.
Figure 3:
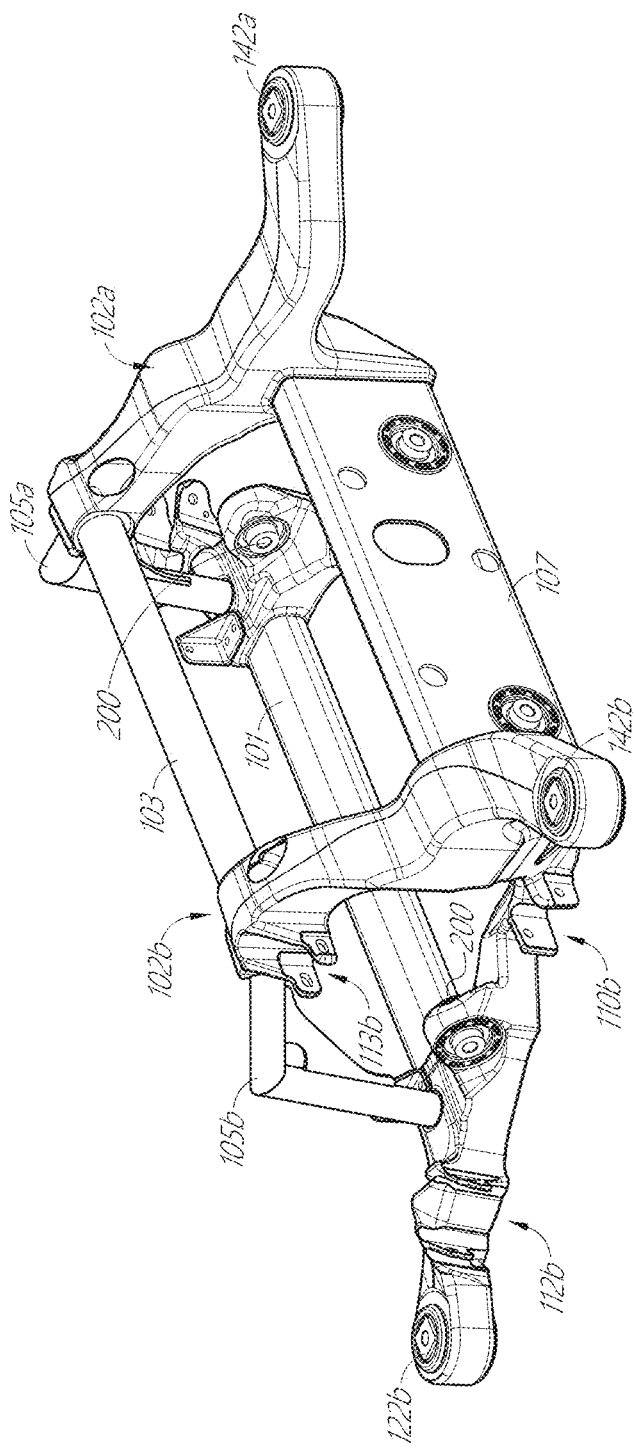
FIG. 3 is rear perspective view of the subframe of FIG. 1.
Figure 4:
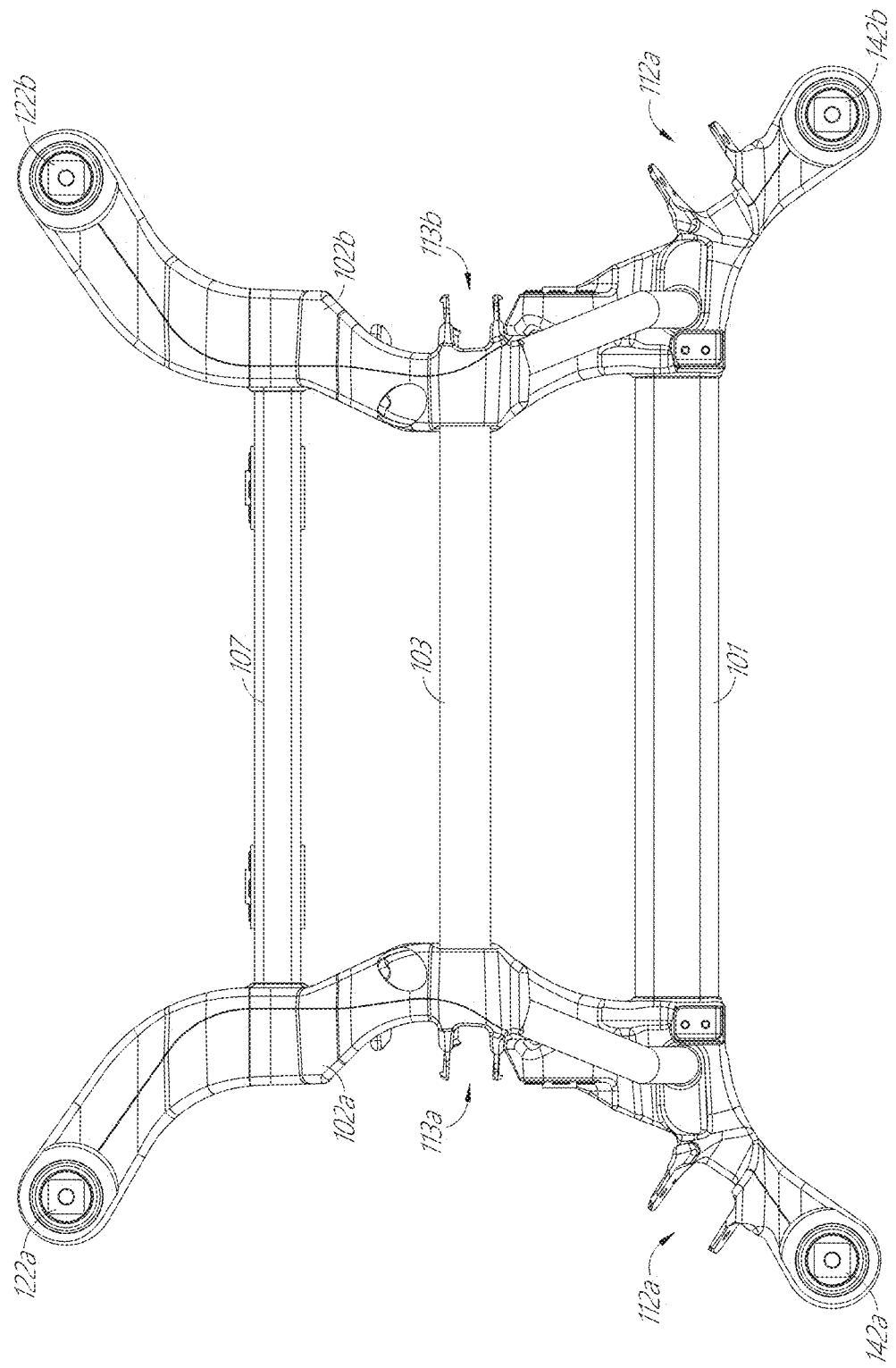
FIG. 4 is an overhead view of the subframe of FIG. 1.
Figure 5:
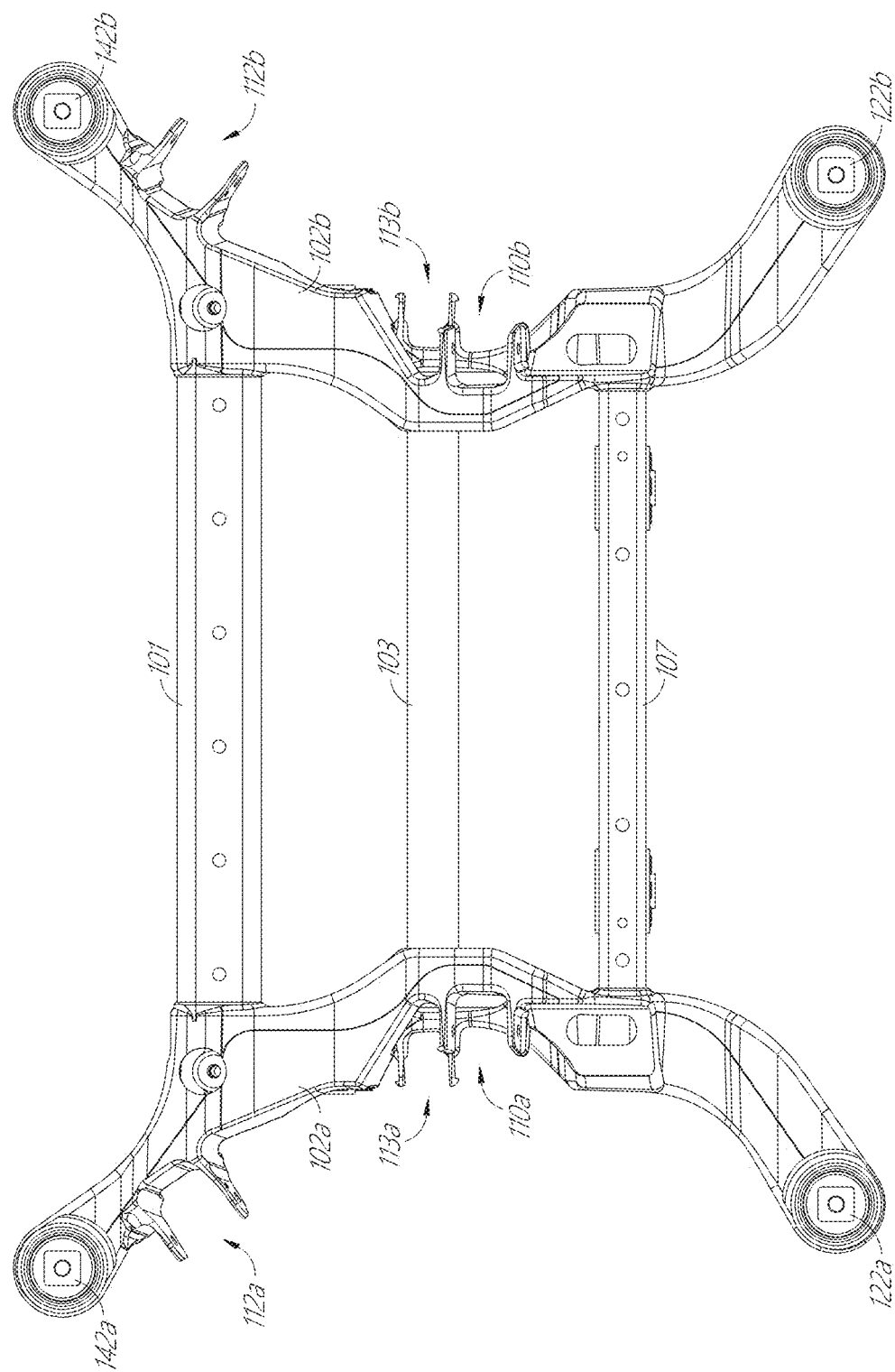
FIG. 5 is an underside view of the subframe of FIG. 1.

The subframe 100 includes a front portion and a rear portion. As shown in FIG. 1, the front cross-car extrusion 101 may be located in the front portion of the subframe 100 and the rear cross-car extrusion 107 may be located in the rear portion of the subframe 100. The front cross-car extrusion 101 may be parallel to the rear cross-car extrusion 107. The front cross-car extrusion 101 and the rear cross-car extrusion 107 may be spaced apart from each other in the longitudinal direction. Additional cross-car extrusions or members may be utilized.

A "lateral axis" is normal to the longitudinal axis and is generally parallel to a width-wise axis extending from the right side of the subframe 100 to the left side of the subframe 100. The "lateral direction" refers to a direction substantially parallel to the lateral axis. As shown, the lateral axis is parallel to the front and rear cross-car extrusions 101, 107. The lateral axis is also parallel to the cross-car roll bar 103.

A "transverse axis" extends normal to both the longitudinal axis and the lateral axis and is generally parallel to a height-wise axis extending from the bottom of the vehicle to the top of the vehicle. The "transverse direction" refers to a direction substantially parallel to the transverse axis. Thus, the rear cross-car extrusion 107 has a height that extends in the transverse direction. The cross car roll bar 103 is generally spaced apart from the front and rear cross-car extrusions 101, 107 by a distance in the transverse direction.

The subframe 100 includes a right portion and a left portion. As shown in FIG. 1, the right casting 102a may be located in the right portion of the subframe 100 and the left casting 102b may be located in the left portion of the subframe 100. The right casting 102a may be generally parallel to the left casting 102b and generally parallel to the longitudinal axis.

Continuing with FIGS. 1-8, the right and left bolt-in braces 105a, 105b are shown in the installed position. As shown, the right bolt-in brace 105a is coupled at one end to a lower front section of the right casting 102a and coupled at the other end to a top central section of the right casting 102a that is adjacent to the top cross car rod 103. Similarly, the left bolt-in brace 105b is coupled at one end to a lower front section of the left casting 102b and coupled at the other end to a top central section of the left casting 102b that is adjacent to the top cross car rod 103. The bolt-in braces 105a, 105b may be removeably coupled to the subframe 100 using one or more bolts or other couplings. While two bolt-in braces 105a, 105b are shown and described, additional bolt-in braces may be included.

The left and right castings 102a, 102b may include one or more built-in receiving spaces 110a, 110b, 112a, 112b, 113a, 113b for one or more suspension components. For example, a lower semi-trailing arm may be coupled to the lower receiving spaces 110a, 110b, 112a, 112b and an upper control arm may be coupled to the upper receiving spaces 113a, 113b.

Figure 8:
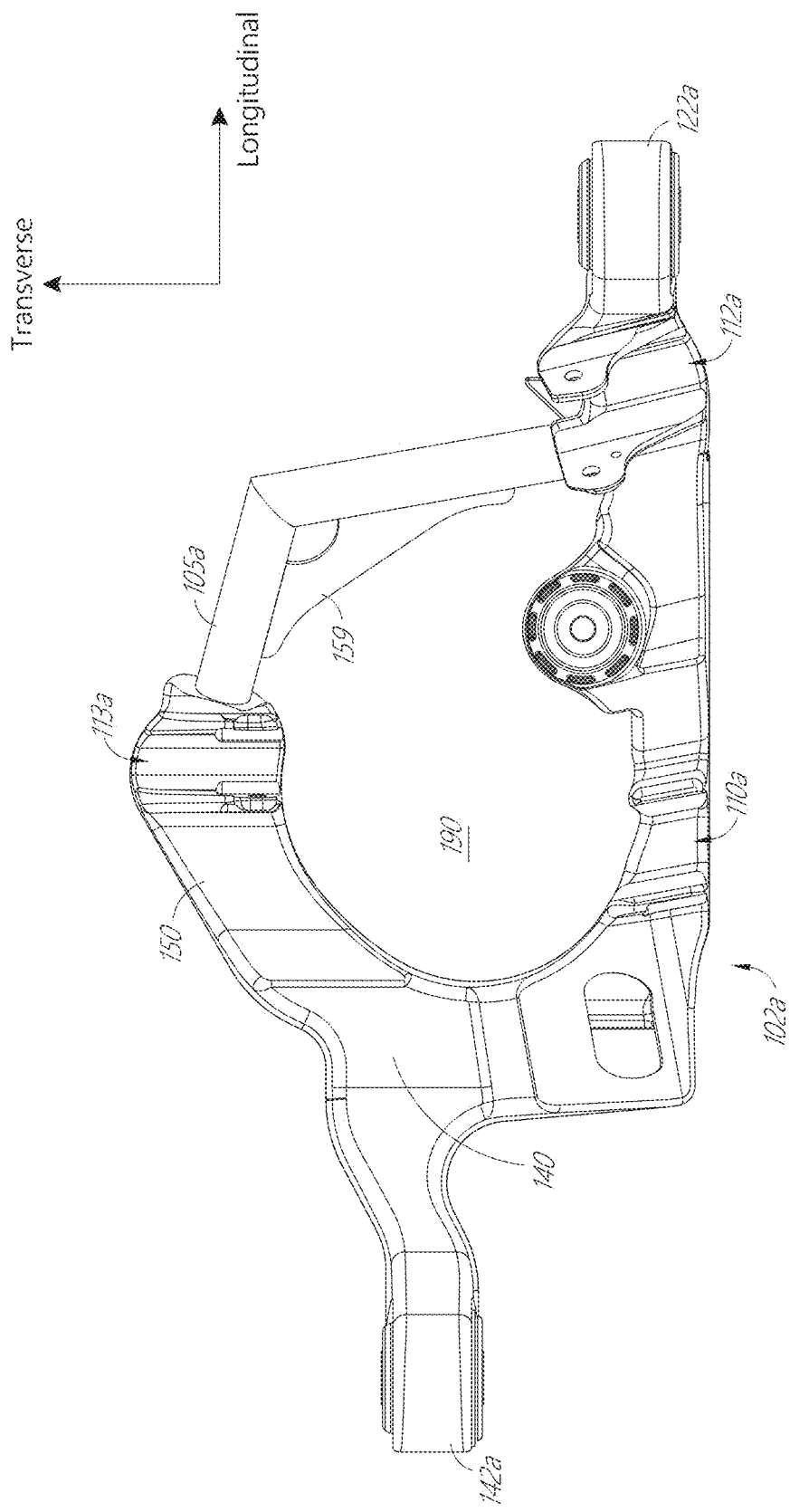
FIG. 8 is a right side view of the subframe of FIG. 1.

As best shown in FIG. 8 the castings 102 include a lower and frontward most mount 122a and the castings then extend rearward along the longitudinal axis. The frontward most mount 122a may be configured to be coupled to a vehicle body. Such mounts may include bushings.

Continuing with the castings 102, extending rearward along the longitudinal axis away from the frontward most mount 122a, the casting 102 may include a transverse portion 140 that splits into a rearward most mount 142a and an archway portion 150. The rearward most mount 142a may include a mount extending along the longitudinal axis. The rearward most mount 142a may be configured to the coupled to the vehicle body. As shown, the rearward most mount 142a may be spaced apart in the transverse direction as compared to the lower and frontward most portion 122a.

The archway portion 150 may terminate at a receiving area for the right bolt-in brace 105a. The right bolt-in brace 105a may be removably attached to the casting 102 in at least two places. The bolt-in brace 105a may extend along the transverse and/or longitudinal axis and connect the archway portion 150 of the casting 102 to the lower portion of the casting 102 that extends along the longitudinal axis. With the bolt-in brace 105a coupled to the casting 102, an enclosure 190 for one or more motors may be formed. The bolt-in braces 105 may be reinforced by a gusset 159.

Figure 9:
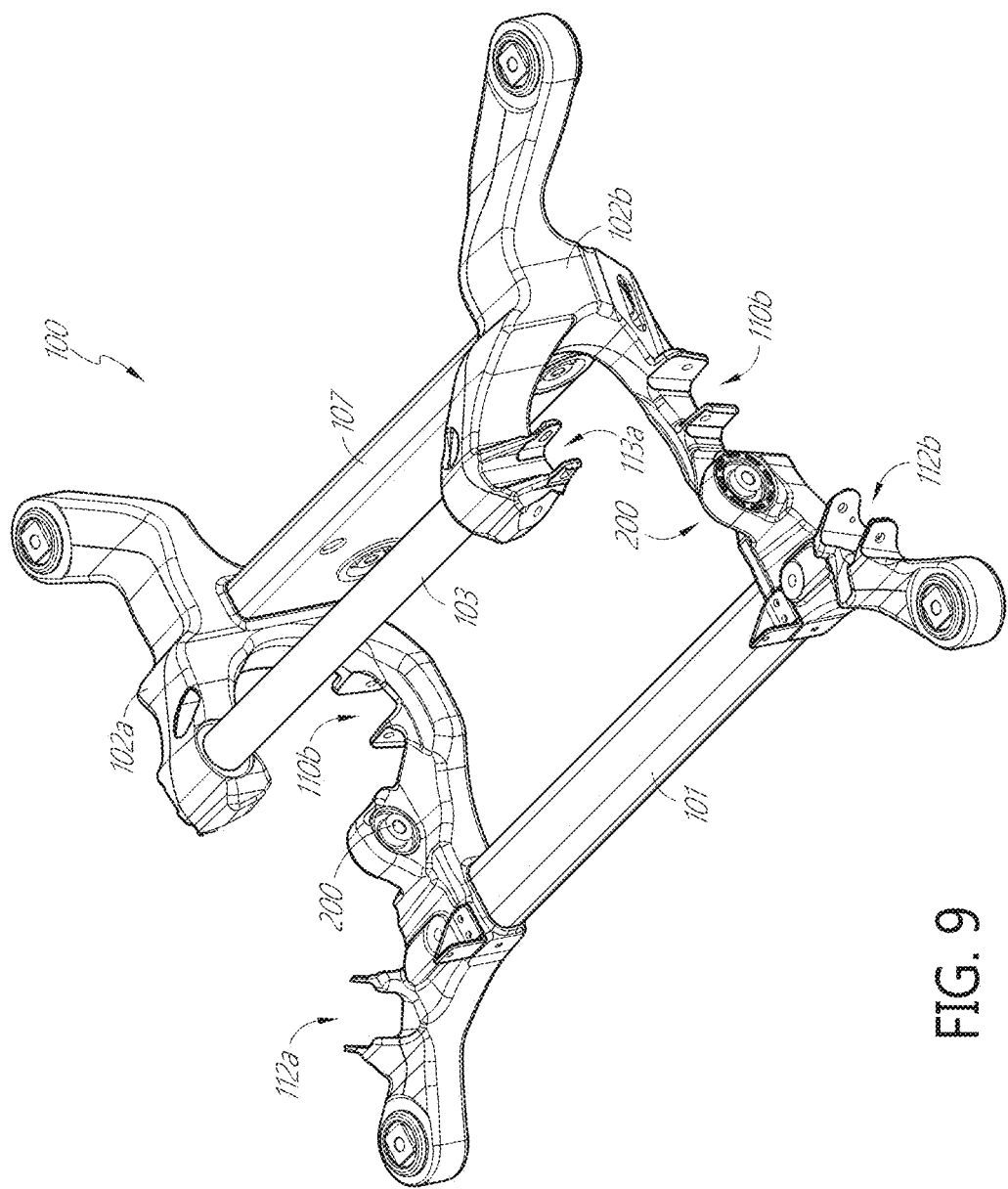
FIG. 9 is the same as FIG. 1 with the two bolt-in braces removed.

Turning to FIG. 9, the subframe 100 is shown with the bolt-in braces 105 removed. A receiving area for one or more motors may be defined by the area inside the perimeter formed by the left and right castings 102a, 102b and the front and rear cross-car extrusions 101, 107.

The subframe 100 may be configured to receive one or more motors that are inserted through the front of the subframe 100. That is to say, the subframe 100 is configured such that the drivetrain components (e.g. the one or two electric motors) may only be inserted into the subframe 100 from the front—passing at least partially over the front cross-car extrusion 101. As shown, the shape of the rear cross-car extrusion 107 may prevent the insertion of a motor through the rear of the subframe 100. In some aspects, the rear cross-car extrusion 107 may prevent or inhibit movement of a motor that is inserted into the subframe 100 in at least the longitudinal direction.

The cross-car roll bar 103 may extend over the receiving area for the one or more motors to define a motor receiving volume. The cross-car roll bar 103 may be fixedly coupled to the left and right castings 102a, 102b. In some aspects, the cross-car roll bar 103 may prevent or inhibit movement of a motor that is inserted into the subframe 100 in at least the transverse direction.

The subframe 100 may include one or more motor mounts 200. The motor mounts 200 may be configured to receive at least a portion of the motor or other motor mount component. As shown in FIG. 9, the motor mounts 200 may be formed into the castings 102a, 102b. In this way, the motors may be secured to the subframe 100 using with only a few components that are at least partially built-in to the subframe 100.

Figure 10:
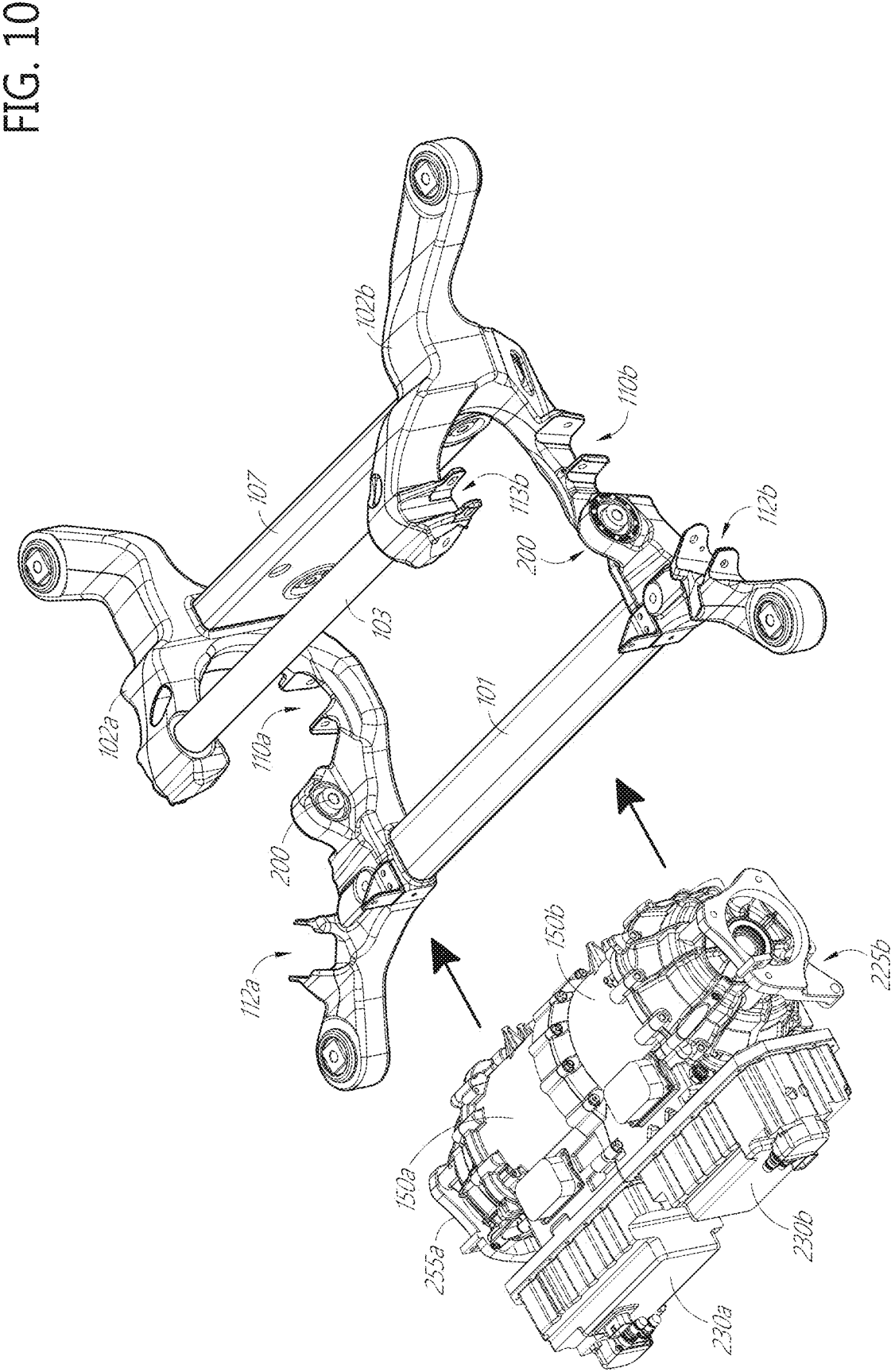
FIG. 10 is the same as FIG. 9 with two electric motors shown as being placed within the subframe in a direction that runs from the front to the rear of the vehicle.

As shown in FIG. 10, at least two motors 150a, 105b and at least two invertors 230a, 230b may be inserted over the front cross-car extrusion 101 and into the motor receiving volume. Brackets 225a, 225b may be coupled to the motors 150a, 105b which are in turn coupled to the motor mounts 200 to secure the motors 150a, 105b within the motor receiving volume.

Figure 11:
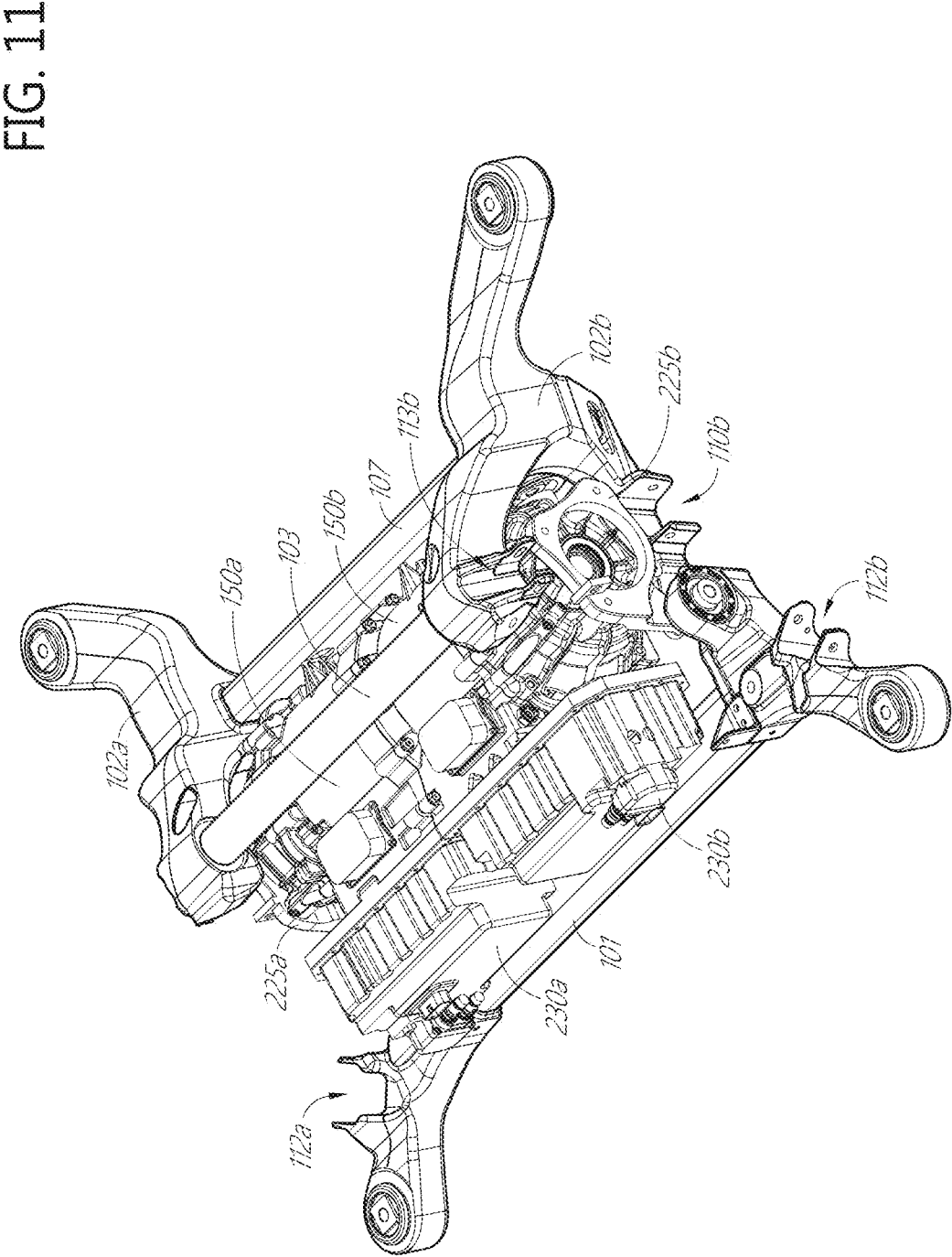
FIG. 11 is the same as FIG. 10 with two electric motors installed within the subframe.

Turning to FIG. 11, the two motors 150a, 105b and two invertors 230a, 230b are shown within the subframe 100 and secured to the motor mounts 200. The motor mounts may help prevent or inhibit movement of the motors 150a, 150b with respect to the subframe 100 in all three directions. While two motors are shown in FIG. 11, one motor 105a may be sufficient.

Figure 12:
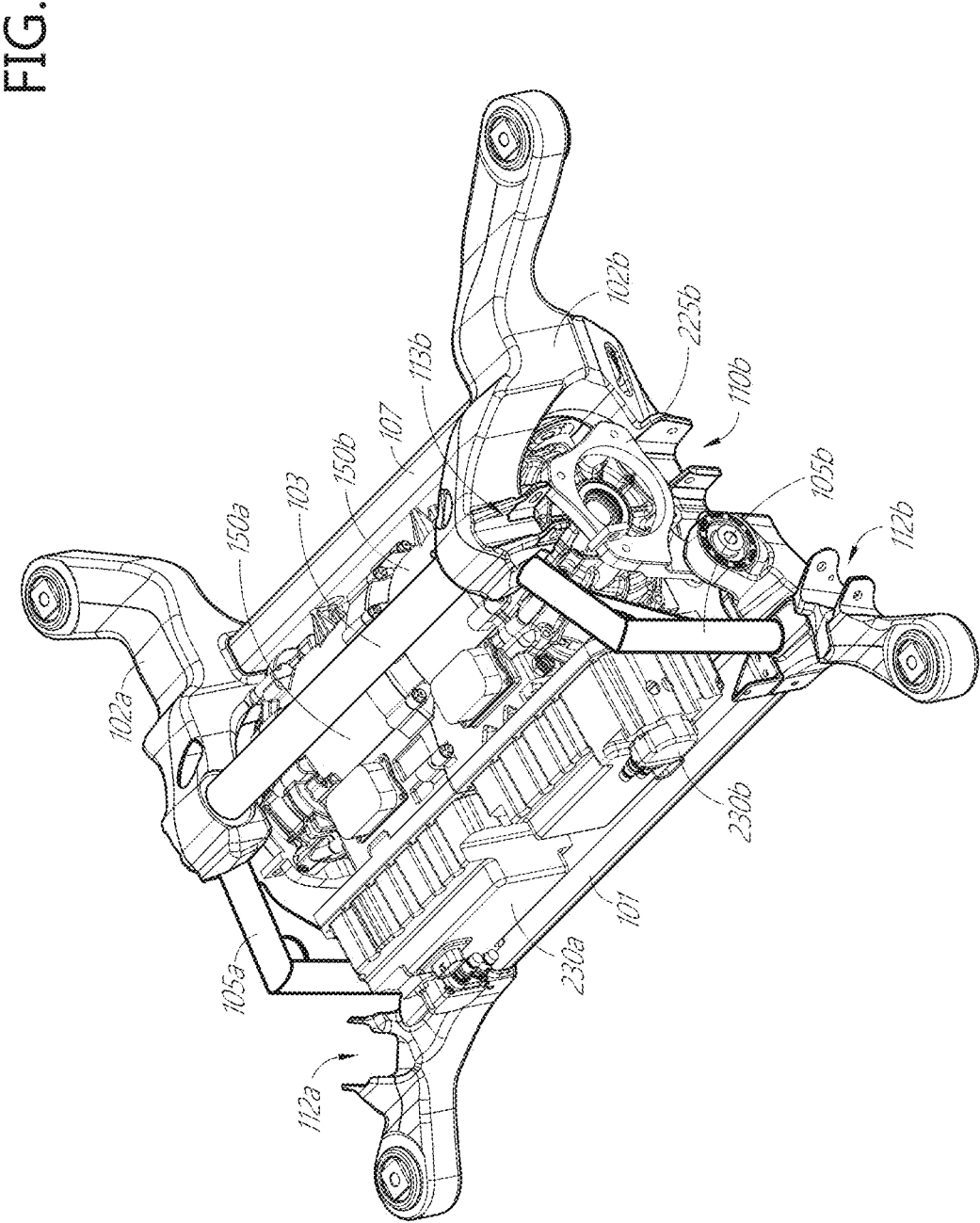
FIG. 12 is the same as FIG. 11 with the two bolt-in braces secured to the subframe to secure the two electric motors in the subframe.
Figure 13:
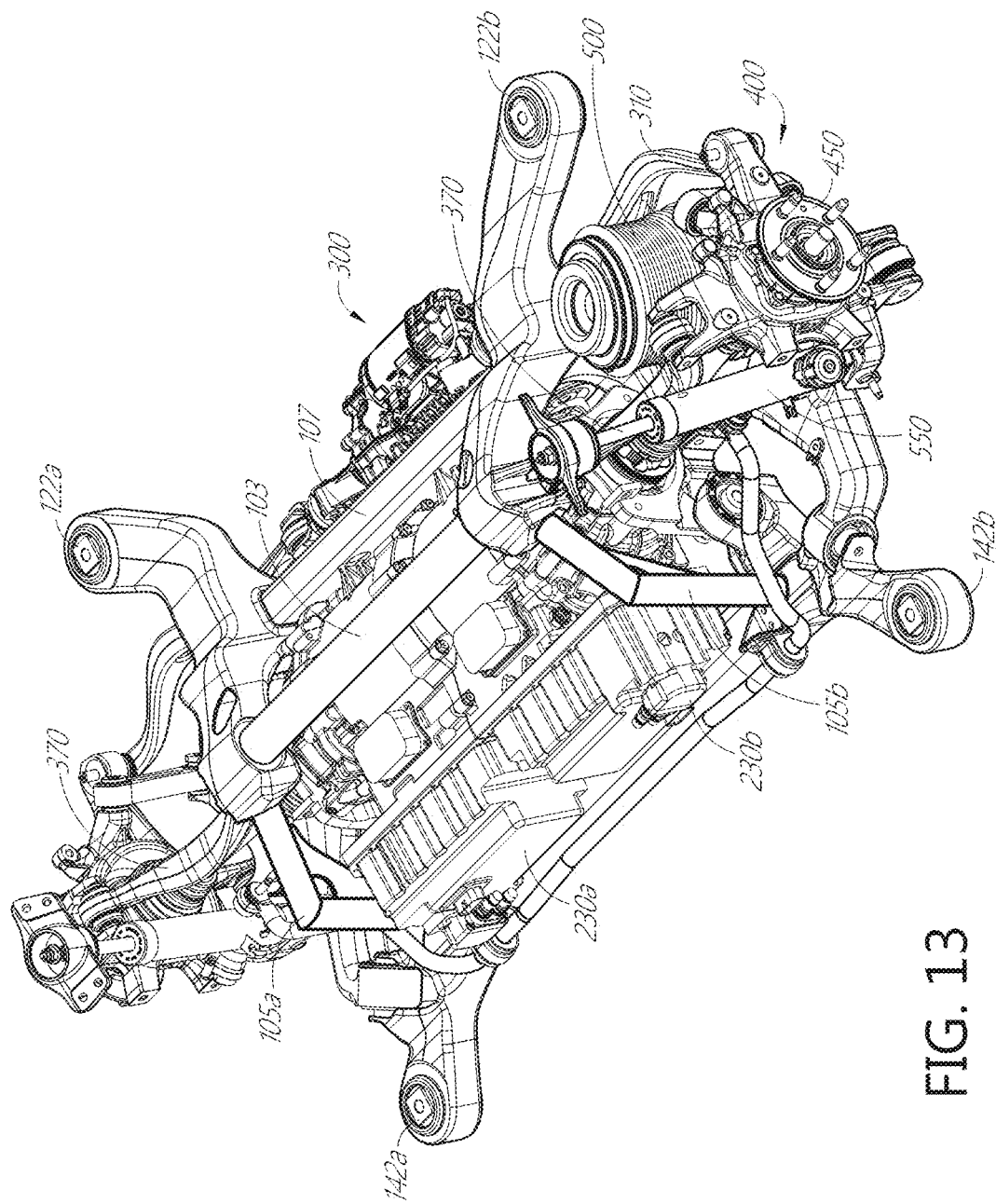
FIG. 13 is the same as FIG. 1 with a drive system, steering system, and suspension system coupled to the subframe.
Figure 14:
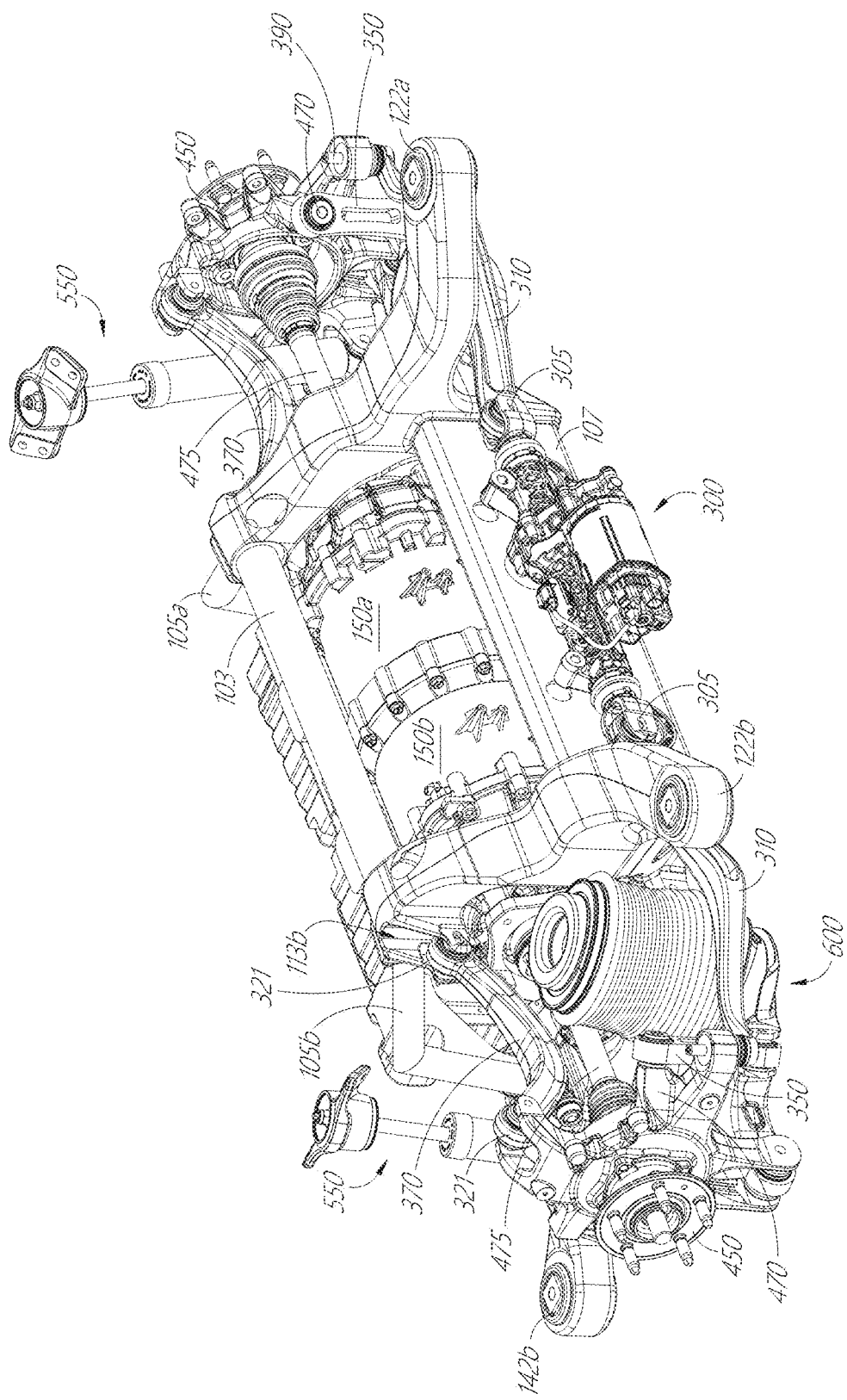
FIG. 14 is a rear perspective view of FIG. 13.
Figure 15:
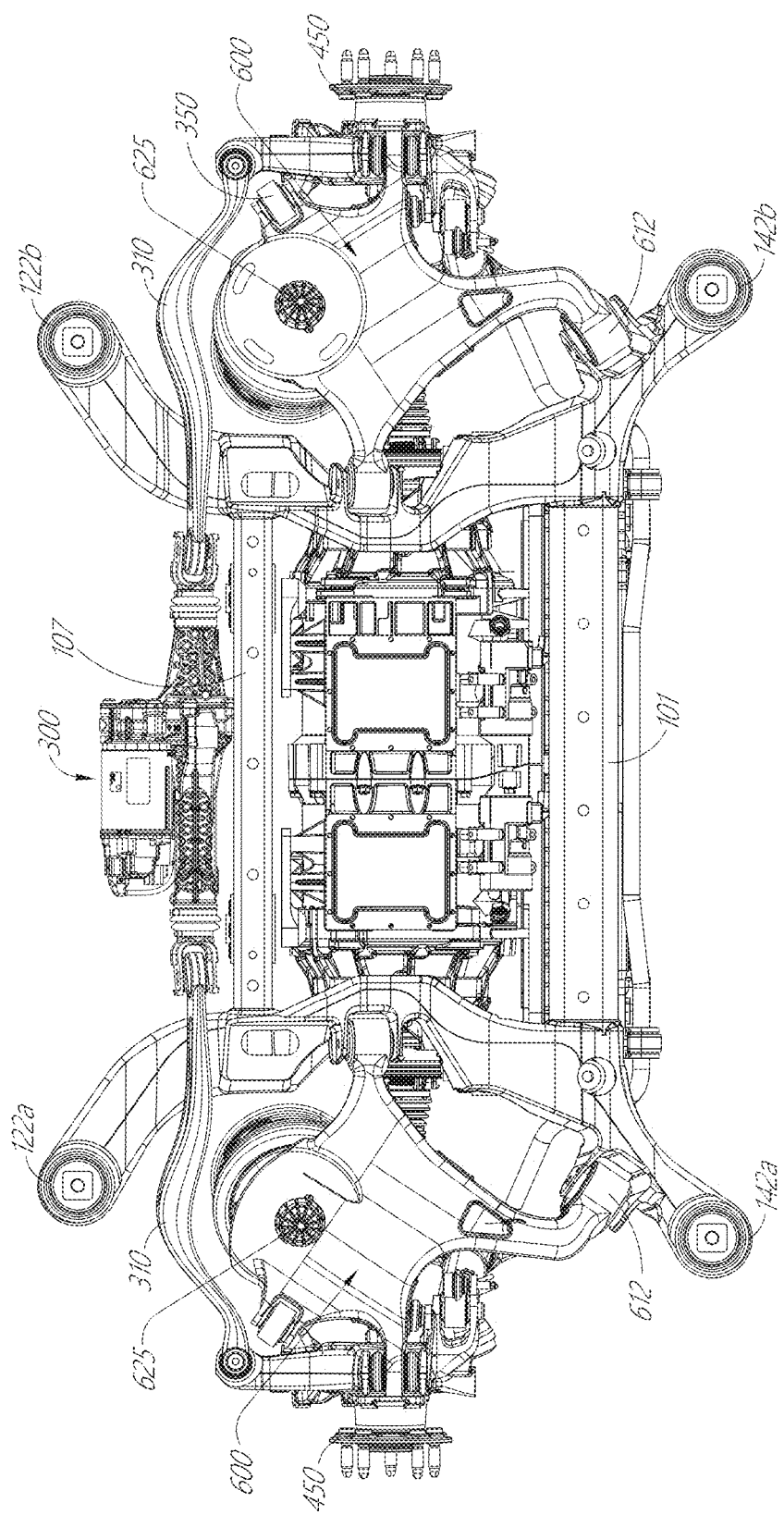
FIG. 15 is an underside view of FIG. 13.

FIG. 12 illustrates the two motors 150a, 105b and two invertors 230a, 230b secured within the subframe 100 and with bolt-in braces 105 coupled to the subframe 100. The braces 105a, 105b may be configured to prevent removal of the one or more motors from the subframe 100. Thus, the braces 105a, 105b may help prevent or inhibit movement of the motors 150a, 150b with respect to the subframe 100 in at least the longitudinal and transverse directions. As shown, the cross-car roll bar 103 extends over the two motors 150a, 105b.

While the bolt-in braces 105a, 105b are shown as connecting two portions of each casting 102a, 102b, the bolt-in braces 105a, 105b may be configured such that they are removably couplable to a portion of a casting 102a, 102b at one end and to a portion of the cross-car roll bar 103 at the other end of the brace. In other implementations, the bolt-in braces 105a, 105b are removably couplable to the front cross-car extrusion 101 at one end and to the cross-car roll bar 103 at the other end of the brace. In other implementations, the bolt-in braces 105a, 105b are removably couplable to the front cross-car extrusion 101 at one end and to a portion of a casting 102a, 102b at the other end of the brace. Additional bolt-in braces 105a, 105b may be utilized. For example, a third bolt-in brace (not shown) may be removably couplable to a center portion of the cross-car extrusion 101 at one end and to a center portion of the cross-car roll bar 103 at the other end of the brace, to further house the motor(s) within the subframe 100.

Turning to FIGS. 13-16, a rear steering system and an independent rear suspension system may be coupled to the subframe 100. The steering system generally includes a steering actuator 300 that is mounted to the rear cross-car extrusion 107. As shown, the steering actuator 300 is coupled to a rear facing surface of the rear cross-car extrusion 107.

The steering actuator 300 includes two couplings 305 at opposite ends. In some implementations, the steering actuator 300 is an active kinematics control actuator available from the ZF Company. The couplings 305 may be connected to track rods 310 which are in turn coupled to the left or right rear wheel steering knuckles 400. Thus, the steering actuator 300 may push or pull on the track rods 310 to rotate the steering knuckles 400 and turn the rear wheels as desired.

The steering knuckles 400 may include a wheel mount 450. The wheel mount 450 may be coupled to an axel 475 which is coupled to an electric motor 150a, 150b. The steering knuckles 400 may be coupled to the subframe 100 with an upper control arm 370 and a lower semi-trailing arm 600. Each steering knuckle 400 may also be coupled to the lower semi-trailing arm 600 with a wind-up link 350. A damper 550 may also be coupled to the steering knuckle 400. The lower semi-trailing arm 600 may support an air spring 500 from below. The air spring 500 may be configured to adjusting the ride height of the vehicle.

Figure 16:
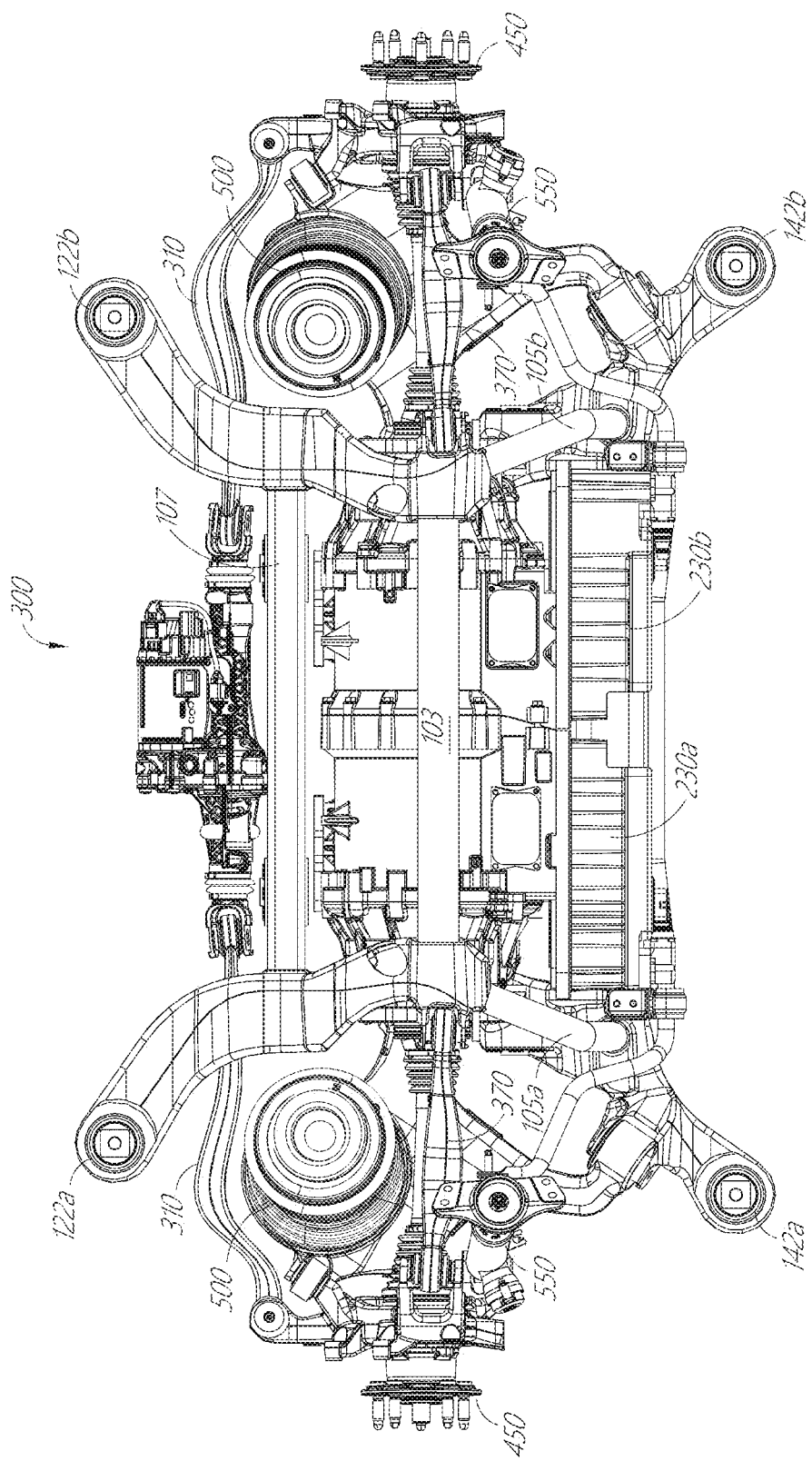
FIG. 16 is an overhead view of FIG. 13.
Figure 17:
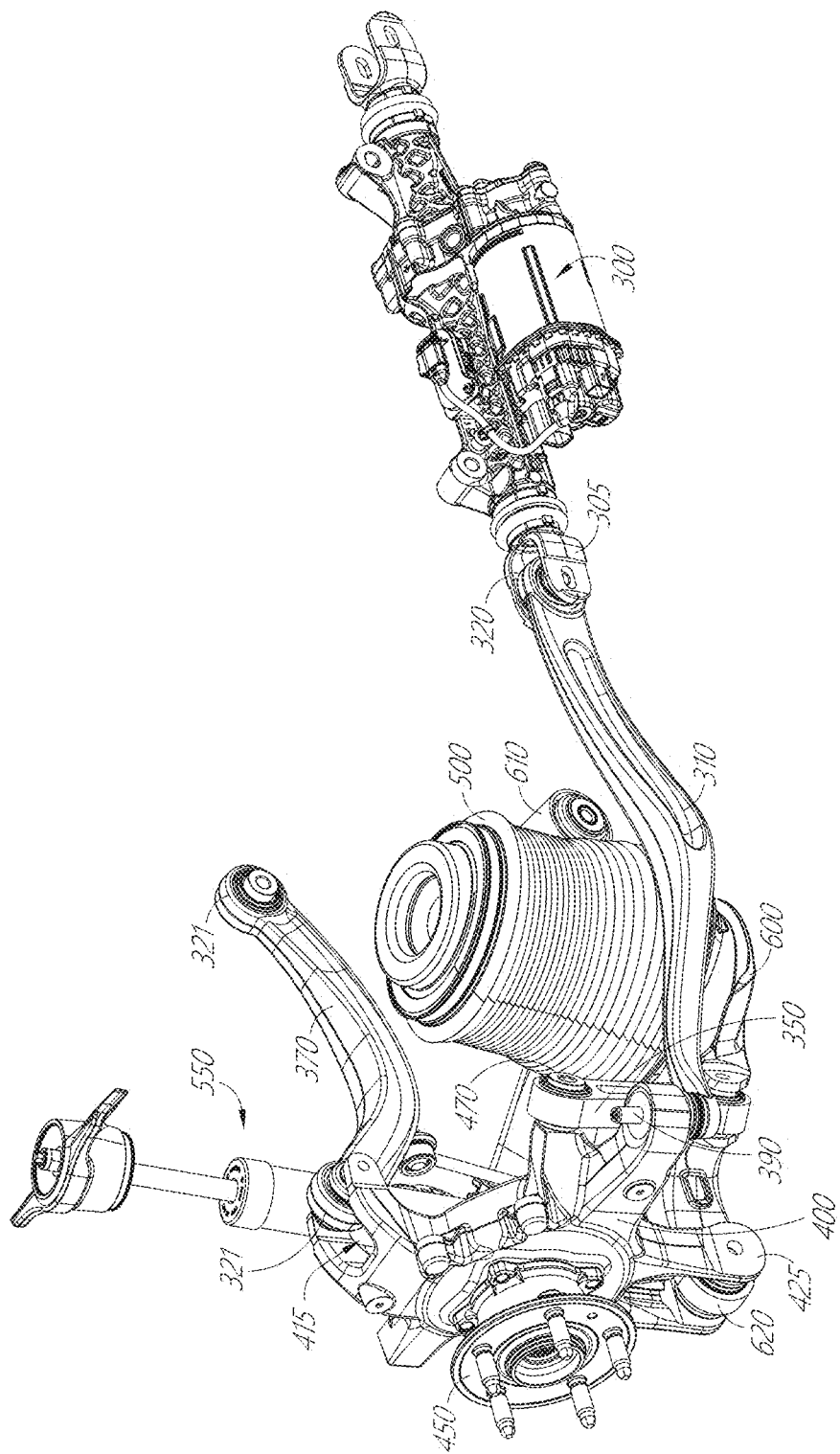
FIG. 17 is a perspective view of left side of the steering system and suspension system.

As shown in FIG. 16, the upper control arms 370 may be positioned substantially in-line with the cross-car roll bar 103 when the subframe 100 is viewed from above. In other words, the upper control arms 370 may extend in a substantially straight line along the lateral axis away from either side of the castings 102a, 102b from a location that is adjacent to the location where the cross-car roll bar 103 is connected to the castings 102a, 102b when the subframe 100 is viewed from above.

The upper control arms 370 may be hingedly coupled to the castings 102a, 102b such that they can rotate up and down with respect to the subframe 100 in the transverse direction. For example, the upper control arms 370 may include knuckles 321 at either end. One control arm knuckle 321 may be inserted into the left of right upper receiving spaces 113a, 113b on the casting and secured within the receiving spaces 113a, 113b with a pin. The control arm knuckles 321 on the opposite side of the control arms 370 may be inserted to into the upper receiving spaces 415 of each steering knuckle 400 and secured with a pin. In this way, the upper control arms 370 and the knuckles 321 may be movable with respect to the subframe 100 in at least the transverse direction.

Figure 18:
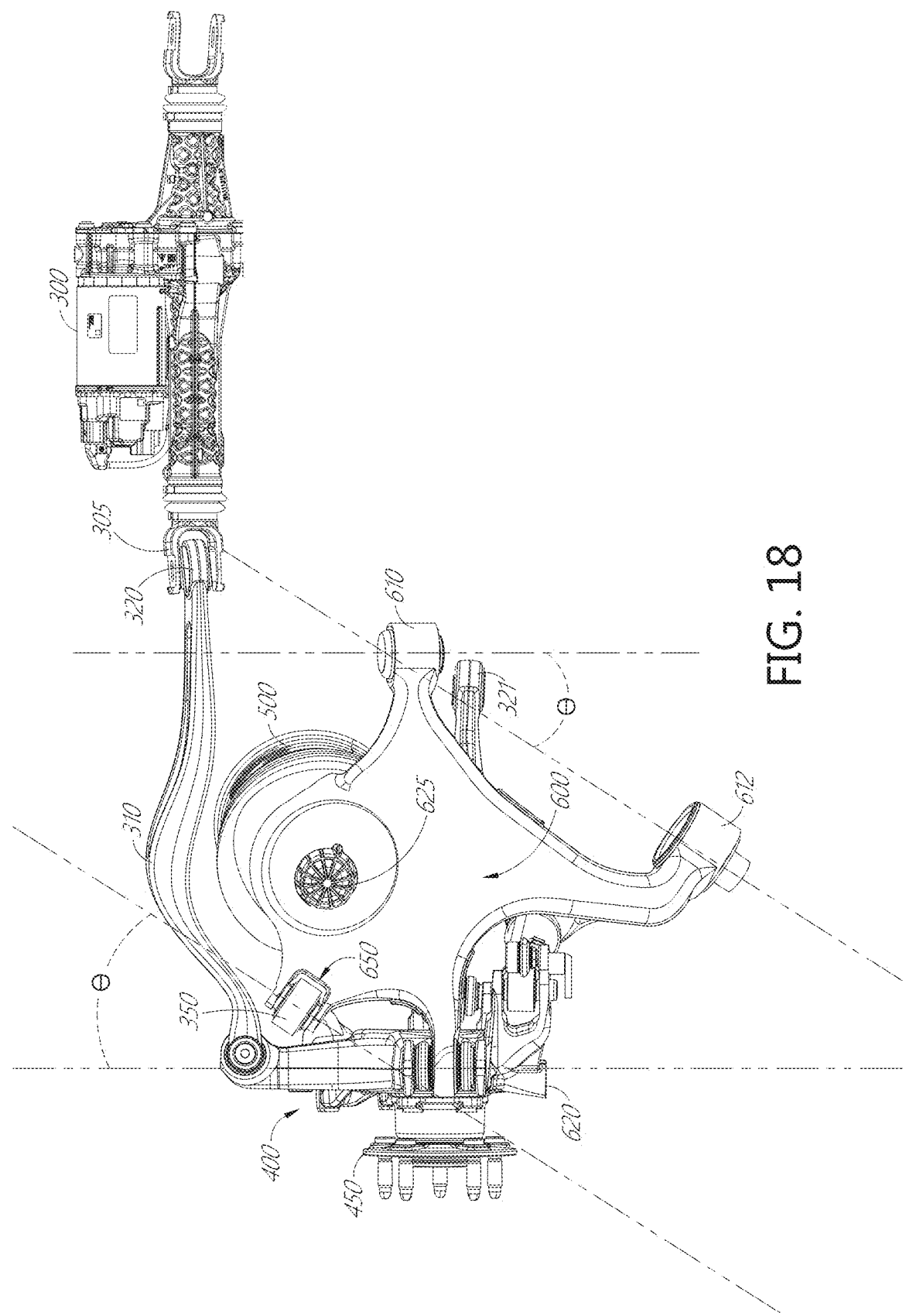
FIG. 18 is an underside view of FIG. 17.
Figure 19:
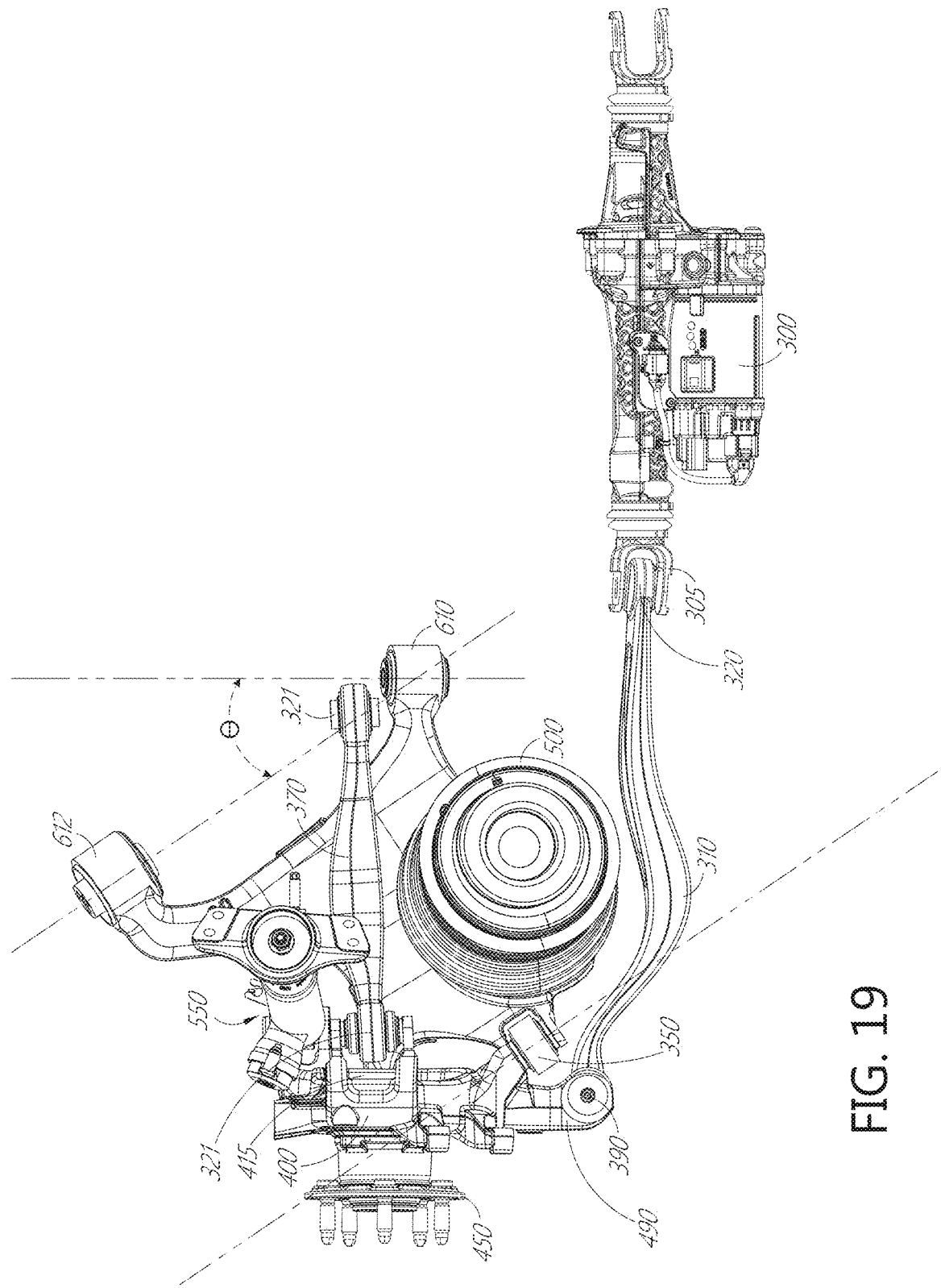
FIG. 19 is an overhead view of FIG. 17.

As also seen in FIGS. 18-19, the track rods 310 may be shaped to accommodate an air spring 500. As such, the track rods 310 may not be substantially linear rods. Rather the track rods 310 may include one or more curved sections to bend around the relatively large air springs 500 required for such a relatively heavy load within the subframe 100.

Figure 20:
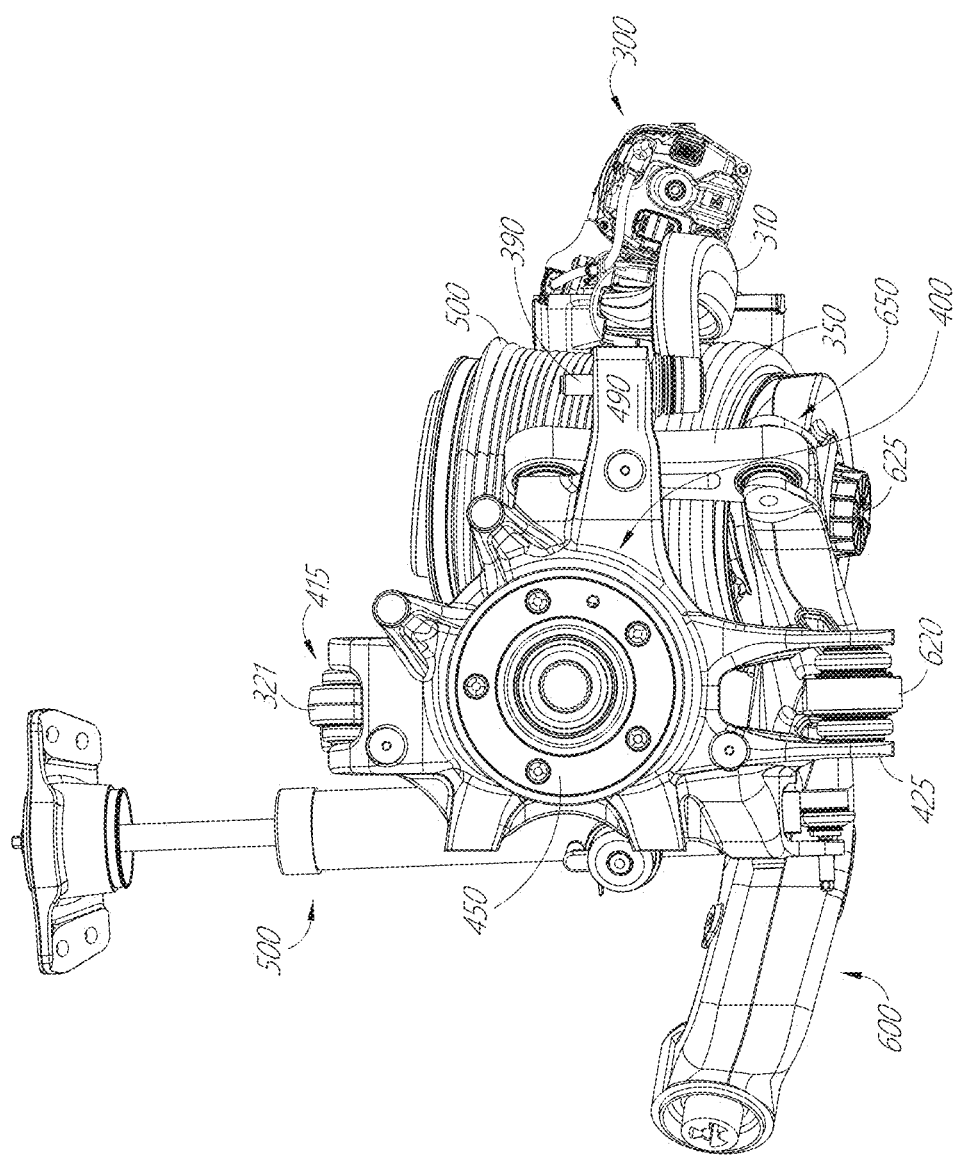
FIG. 20 is a head on view of FIG. 17.
Figure 21:
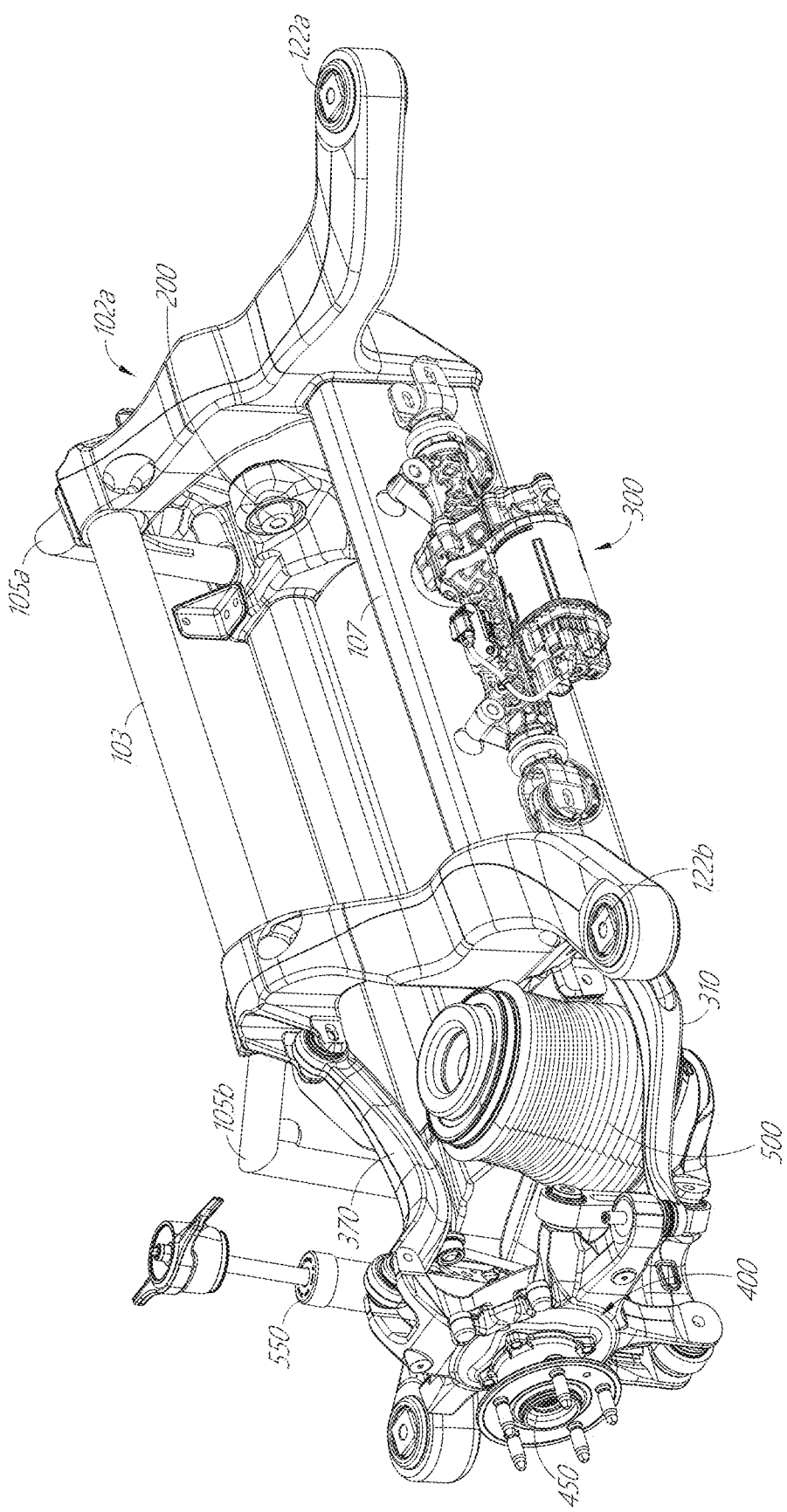
FIG. 21 is a rear perspective view of the steering system and suspension system of FIG. 17 coupled to the subframe of FIG. 1.

With reference to FIGS. 18-20, the track rods 310 may be hingedly coupled to the steering actuator 300 such that the track rods 310 may be able to rotate with respect to the steering actuator 300 about a connection point between the track rod 310 and the steering actuator 300 in at least the transverse direction. In some aspects, the steering actuator 300 includes a leaf 305 configured to receive a track rod knuckle 320. The steering actuator leaf 305 may be coupled to the track rod knuckle 320 with a pin.

As best shown in FIG. 20, the track rods 310 may include a track rod pin 390 at the end that is opposite to the end that terminates in the track rod knuckle 320. The track rod pin 390 may extend away from the track rod 310 in the transverse direction. The track rod pin 390 may be inserted upwardly into an opening in a rearward, longitudinally extending lever portion 490 of the steering knuckle 400. Thus, the steering knuckle 400 may be rotated with respect to the track rods 310 when the track rod moves in the lateral direction. In some aspects, the longitudinally extending lever portion 490 of the steering knuckle 400 is positioned below a longitudinally extending line passing through the transverse center of the wheel mount 450.

Figure 22:
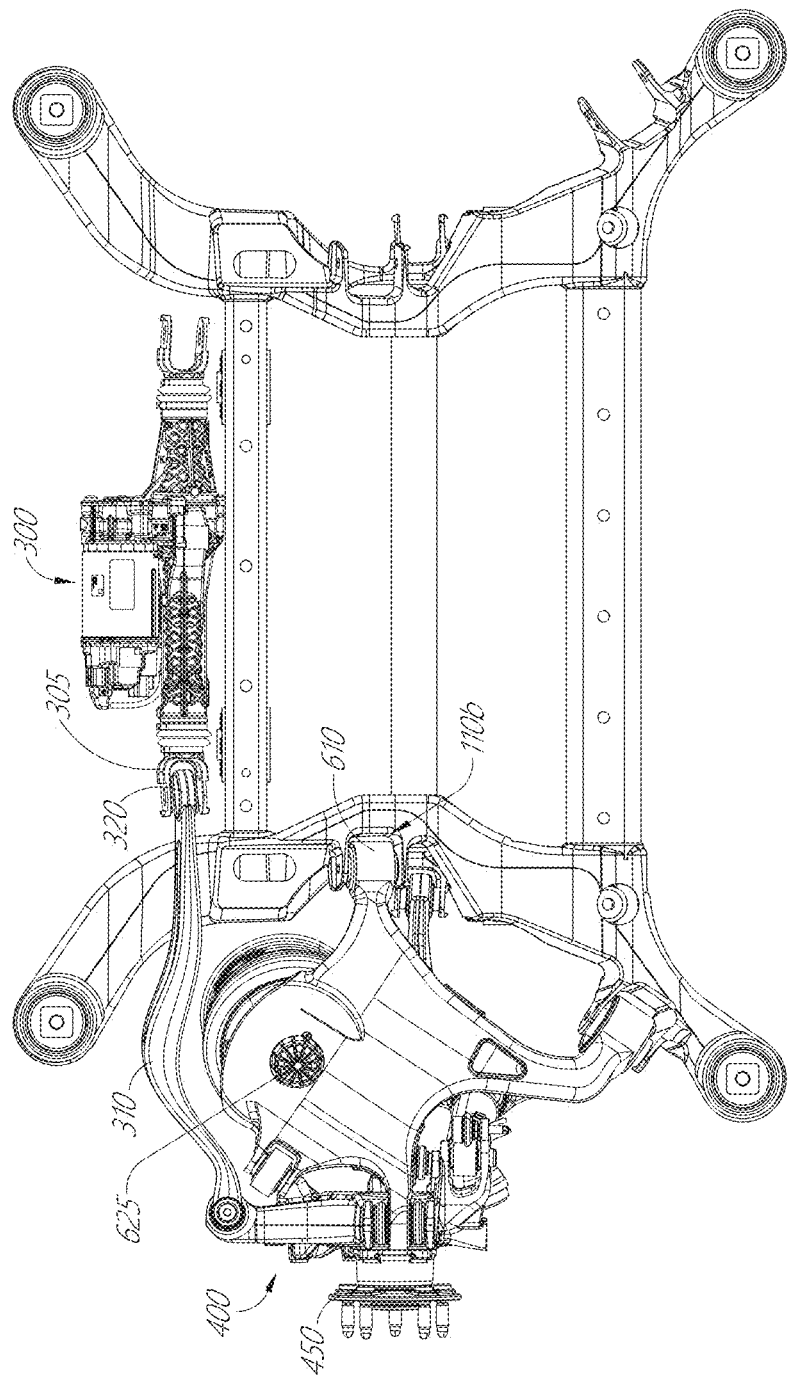
FIG. 22 is an underside view of FIG. 21.
Figure 23:
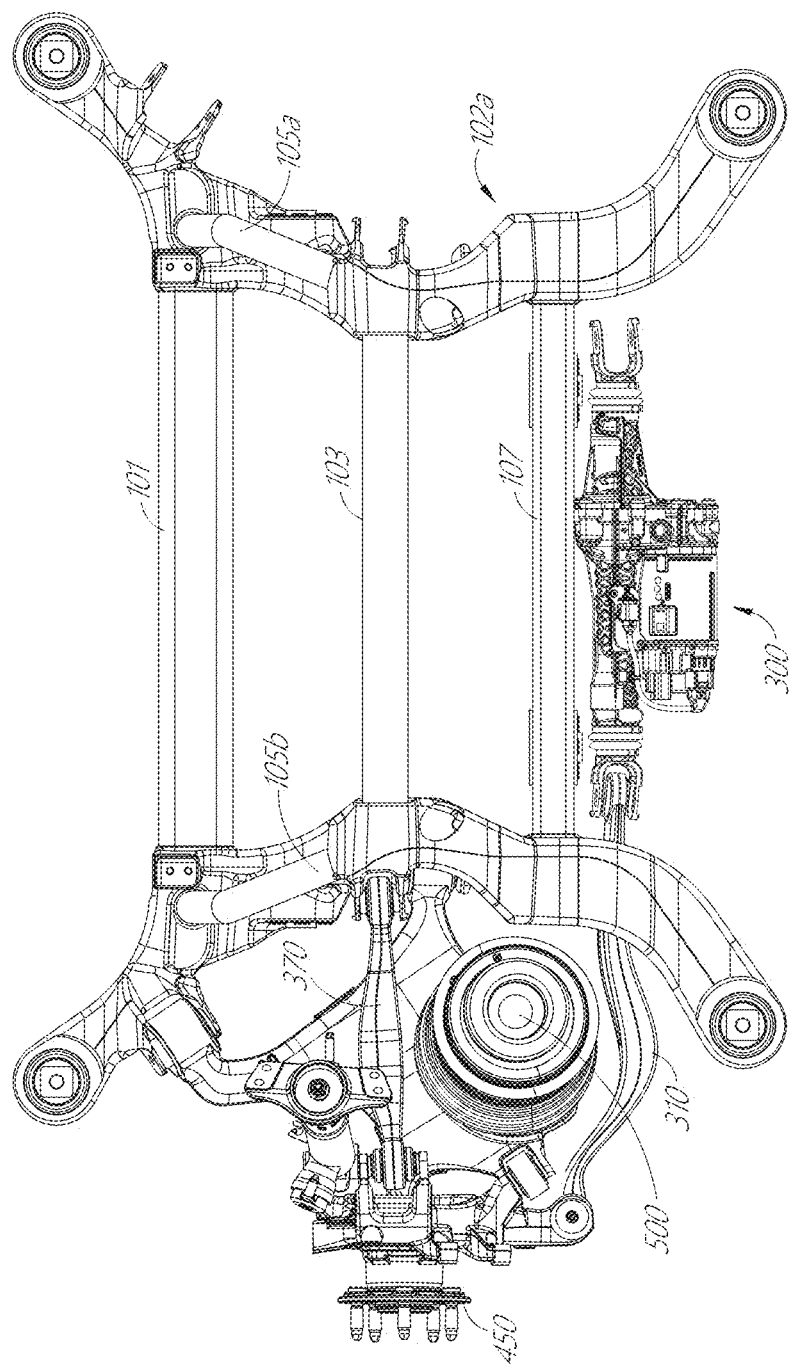
FIG. 23 is an overhead view of FIG. 21.
Figure 24:
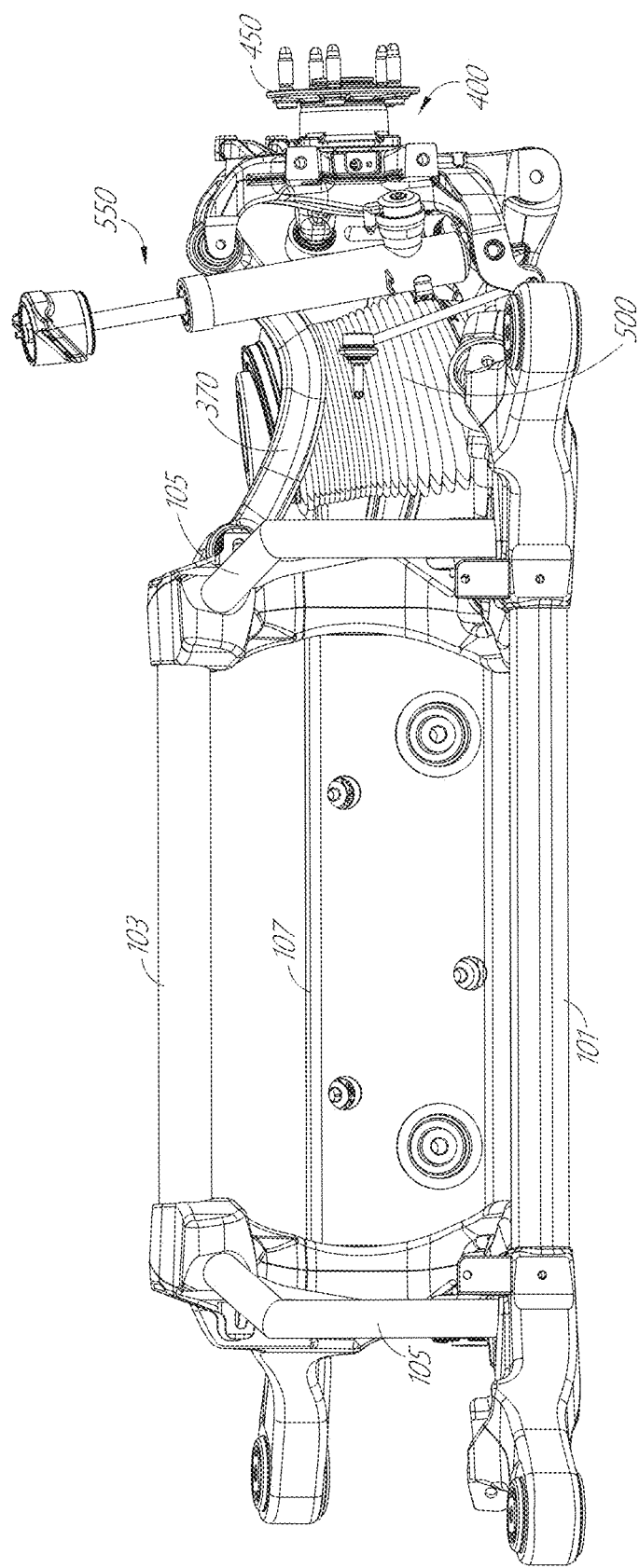
FIG. 24 is a front view of FIG. 21.
Figure 25:
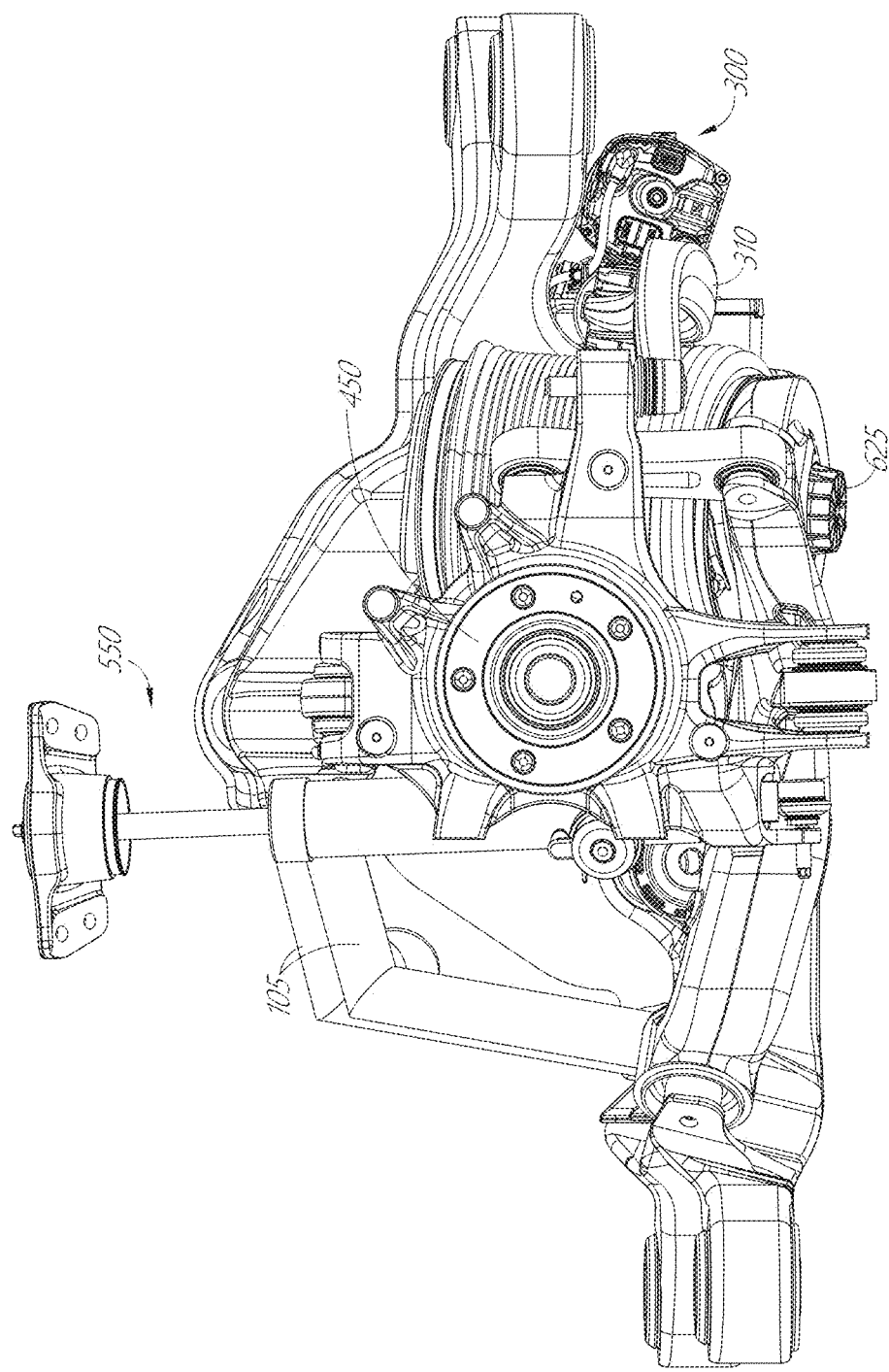
FIG. 25 is a head on view of FIG. 21.

As shown, for example, in FIGS. 18 & 22, the lower semi-trailing arm 600 may be coupled to the subframe 100 at two spaced apart locations. The lower semi-trailing arm 600 may also be configured to pivot about at least two connection points with the castings 102a, 102b. For example, the lower semi-trailing arm 600 may include a front semi-trailing arm knuckle 612 and a rear semi-trailing arm knuckle 610. The lower semi-trailing arm 600 may include a vent 625 on the configured to draw in and/or expel air from the air spring 500 positioned on the lower semi-trailing arm 600.

The rear semi-trailing arm knuckle 610 may be inserted into receiving space 110a, 110b on the castings 102a, 102b. The rear semi-trailing arm knuckle 610 may be secured to the receiving space 110a, 110b by a pin. Such as connection may allow for the lower semi-trailing arm 600 to pivot with respect to the subframe 100 in at least the transverse direction. The rear semi-trailing arm knuckle 610 may thus pivot about the longitudinal axis.

The front semi-trailing arm knuckle 612 may be inserted into receiving space 112a, 112b on the castings 102a, 102b. The front semi-trailing arm knuckle 612 may be secured to the receiving space 112a, 112b by a pin. Such as connection may allow for the lower semi-trailing arm 600 to pivot with respect to the subframe 100 in at least the transverse direction. As shown, the axis of rotation of the front semi-trailing arm knuckle 612 may be offset from the longitudinal axis by an angle θ. In some implementations, this angle θ is 30°. However, the angle θ may be any suitable angle. For example, the angle θ may be between 15° and 45°.

The lower semi-trailing arm 600 may also be coupled to the steering knuckle 400 at two spaced apart locations. For example, the lower semi-trailing arm 600 may include an outside knuckle 620 that is inserted into a lower leaf 425 in the steering knuckle 400 and secured with a pin.

A wind-up rod 350 may also be used to couple the lower semi-trailing arm 600 to the steering knuckle 400. One end of the wind-up rod 350 may include a mount that is inserted into a leaf 650 on an outward edge that is positioned rearward of the outside knuckle 620. The other end of the wind-up rod 350 may include an opening for receiving a pin 470 extending from the steering knuckle 400. As shown in FIG. 20, the wind-up rod 350 may be generally parallel with the transverse axis and may be positioned behind the longitudinally extending lever portion 490 of the steering knuckle 400 when viewed in the lateral direction.

Figure 26:
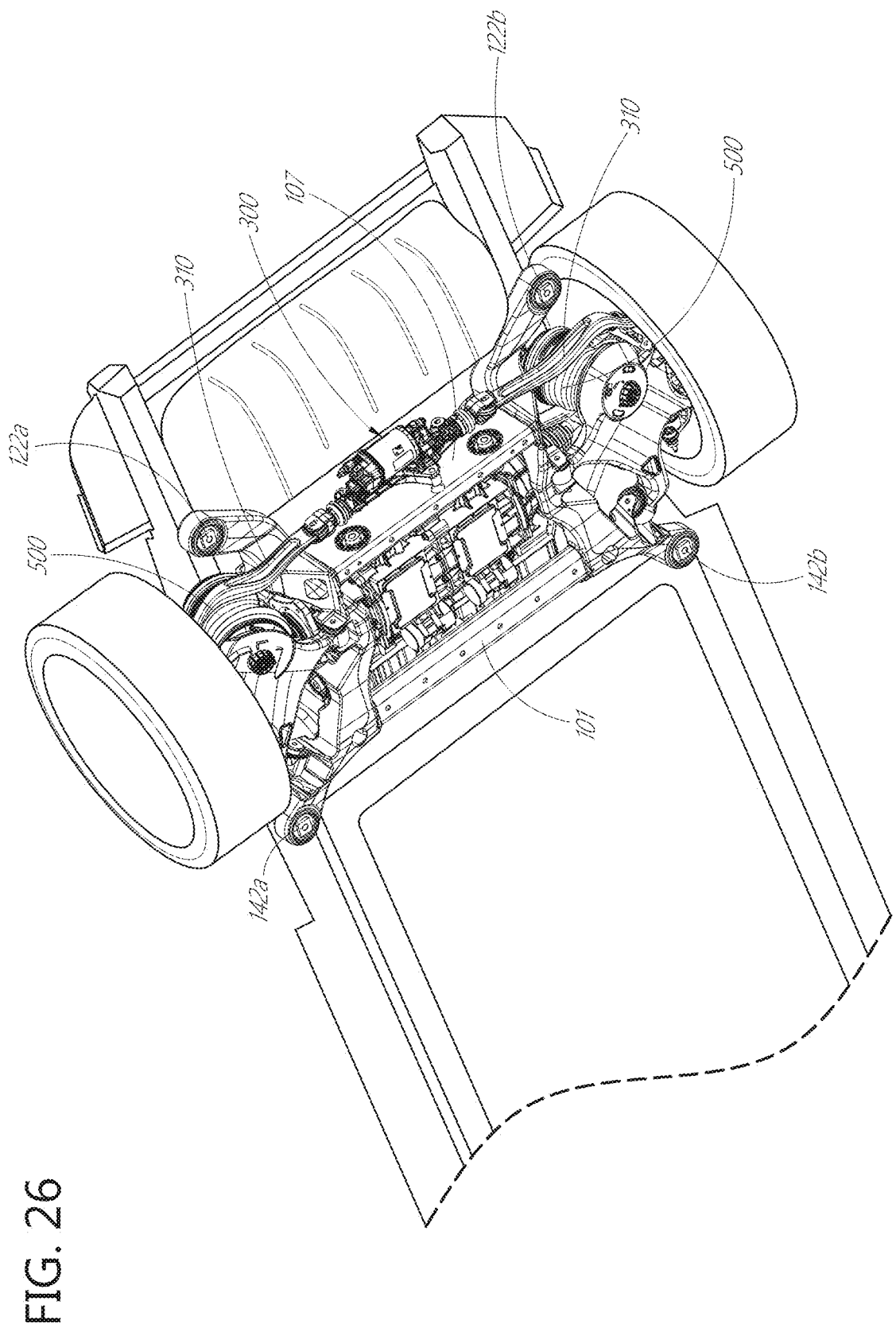
FIG. 26 is a partial perspective view of the underside of a vehicle having the subframe, drive system, steering system, and suspension system of FIG. 13 coupled to the frame of a vehicle.

FIG. 26 illustrates the subframe, drive system, steering system, and suspension system described above installed in the rear of a vehicle. As shown, the mounts 122a, 122b, 142a, 142b are coupled to the underside of a vehicle's frame.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes, and variations may be made in the arrangement, operation, and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A system for housing at least one electric motor in an electric automobile comprising:
 a subframe comprising at least two castings extending in a longitudinal direction and spaced apart from one another in a lateral direction;
 the at least two castings coupled together by a laterally extending front cross-car extrusion and a laterally extending rear cross-car extrusion, the rear cross-car extrusion spaced away from the front cross-car extrusion in the longitudinal direction to define an area that is bounded by the at least two castings, the laterally extending front cross-car extrusion, and the laterally extending rear cross-car extrusion;
 a laterally extending roll bar coupled to the at least two castings and positioned over the area to define a motor receiving volume receiving the at least one motor inserted over the front cross-car extrusion;
 at least two braces removably coupleable to the subframe, the at least two braces preventing removal of the at least one electric motor inserted over the front cross-car extrusion when the at least two braces are coupled to the subframe; and
 a lower semi-trailing arm hingedly connected to each casting, the lower semi-trailing arm supporting an air spring from below and comprising a vent for drawing in and expelling air from the air spring.

2. The system of claim 1, wherein the at least two castings include at least a portion of a motor mount configured to secure the at least one electric motor with respect to the castings.

3. The system of claim 1, further comprising a rear steering actuator coupled to the rear cross-car extrusion.

4. The system of claim 3, wherein the rear steering actuator is coupled to a rear facing surface of the rear cross-car extrusion.

5. The system of claim 4, further comprising two laterally extending track rods coupled to opposite sides of the rear steering actuator, the track rods including at least one section that curves in the longitudinal direction.

6. The system of claim 5, wherein the two track rods are each respectively coupled to two different knuckles with a pin that extends upward through an underside of the knuckle.

7. The system of claim 1, further comprising a rear steering actuator coupled to the rear cross-car extrusion and two laterally extending track rods coupled to opposite sides of the rear steering actuator, the track rods including at least one curved section accomodating the air spring.

8. The system of claim 1, further comprising two upper control arms hingedly connected to each casting and extending laterally away from the casting and positioned in-line with the roll bar when viewed from above.

* * * * *